United States Patent
Yamamoto et al.

(10) Patent No.: US 7,886,333 B2
(45) Date of Patent: Feb. 8, 2011

(54) IN-VEHICLE RECORDING/REPRODUCTION DEVICE, RECORDING/REPRODUCTION DEVICE, RECORDING/REPRODUCTION SYSTEM, AND RECORDING/REPRODUCTION METHOD

(75) Inventors: Akihiro Yamamoto, Osaka (JP); Toshikazu Hattori, Yokohama (JP); Atsushi Yamashita, Osaka (JP); Takashi Kuwabara, Yokohama (JP)

(73) Assignee: Panasonic Corporation, Osaka (JP)

( * ) Notice: Subject to any disclaimer, the term of this patent is extended or adjusted under 35 U.S.C. 154(b) by 908 days.

(21) Appl. No.: 10/548,302

(22) PCT Filed: Mar. 16, 2004

(86) PCT No.: PCT/JP2004/003478

§ 371 (c)(1),
(2), (4) Date: Sep. 6, 2005

(87) PCT Pub. No.: WO2004/084222

PCT Pub. Date: Sep. 30, 2004

(65) Prior Publication Data

US 2006/0184969 A1    Aug. 17, 2006

(30) Foreign Application Priority Data

Mar. 19, 2003   (JP) .............................. 2003-076216

(51) Int. Cl.
*H04N 7/16* (2006.01)
(52) U.S. Cl. ...................... 725/153; 725/151; 725/152; 725/133; 725/134; 386/66
(58) Field of Classification Search ................... 725/89; 369/2
See application file for complete search history.

(56) References Cited

U.S. PATENT DOCUMENTS

| 5,365,502 | A | * | 11/1994 | Misono | ........................ | 369/18 |
| 5,522,911 | A | | 6/1996 | Terneu et al. | | |
| 6,760,535 | B1 | * | 7/2004 | Orr | .............................. | 386/46 |
| 7,065,778 | B1 | * | 6/2006 | Lu | ............................... | 725/98 |
| 7,206,559 | B2 | * | 4/2007 | Meade, II | ................. | 455/151.1 |

(Continued)

FOREIGN PATENT DOCUMENTS

EP    1 292 136    3/2003

(Continued)

*Primary Examiner*—John W Miller
*Assistant Examiner*—Robert Hance
(74) *Attorney, Agent, or Firm*—Wenderoth, Lind & Ponack, L.L.P.

(57) ABSTRACT

An in-vehicle recording/reproduction device (121) records in a recording device a program which the user starts watching, and reads and reproduces the data when watching is permitted, such as, for example, when a vehicle is stopped. The in-vehicle recording/reproduction device (121) transmits recording information about recording, such as a program, a time, and the like, to an in-home recording/reproduction device (303). The in-home recording/reproduction device (303) records the same program as that recorded by the in-vehicle recording/reproduction device (121) based on the recording information. The in-vehicle recording/reproduction device (121) transmits to the in-home recording/reproduction device (303) reproduction information indicating which scene was last reproduced in the in-vehicle recording/reproduction device (121). The in-home recording/reproduction device (303) performs reproduction based on the reproduction information. Thereby, it is possible to watch the rest of the program which was watched in the vehicle, at home without missing a scene.

14 Claims, 14 Drawing Sheets

U.S. PATENT DOCUMENTS

| | | | |
|---|---|---|---|
| 7,325,073 B2 * | 1/2008 | Shao et al. | 709/238 |
| 7,548,565 B2 * | 6/2009 | Sull et al. | 370/503 |
| 2002/0069218 A1 * | 6/2002 | Sull et al. | 707/501.1 |
| 2003/0067562 A1 * | 4/2003 | Hafner et al. | 348/838 |

FOREIGN PATENT DOCUMENTS

| | | |
|---|---|---|
| JP | 6-111545 | 4/1994 |
| JP | 7-2548 | 1/1995 |
| JP | 3249845 | 11/2001 |
| JP | 3254946 | 11/2001 |
| JP | 2002-197775 | 7/2002 |
| JP | 2002-300502 A * | 10/2002 |

* cited by examiner

F I G. 1
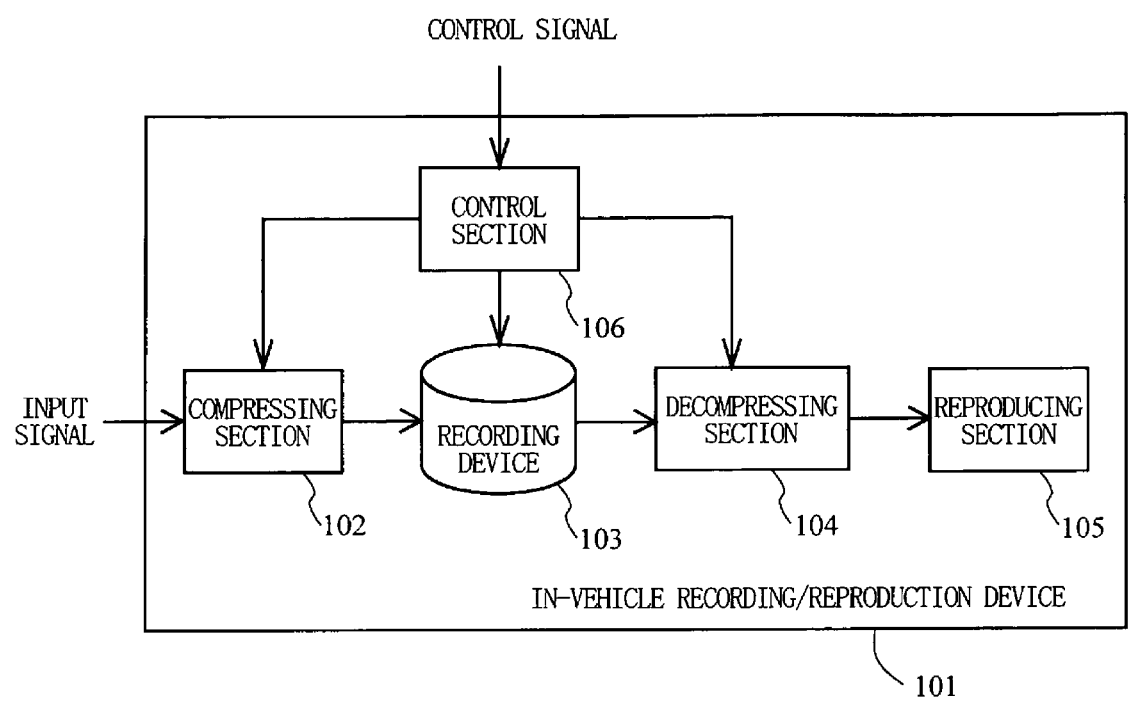

IN-VEHICLE RECORDING/REPRODUCTION DEVICE, RECORDING/REPRODUCTION DEVICE, RECORDING/REPRODUCTION SYSTEM, AND RECORDING/REPRODUCTION METHOD

BACKGROUND OF THE INVENTION

1. Technical Field

The present invention relates to a signal recording/reproduction device, and more particularly, to a recording/reproduction device, a recording/reproduction system, and a recording/reproduction method for perform reproduction in a vehicle and between the vehicle and home without missing a scene.

2. Background Art

For safe driving, existing in-vehicle television systems do not permit the user to watch video while driving. Therefore, when the user wants to watch a television program in a vehicle, the user has to stop the vehicle.

Japanese Patent No. 3254946 (pages 2 to 4, FIG. 1) proposes an in-vehicle information processing device which allows the user to watch in a vehicle a television program which the user could not watch during driving. The in-vehicle information processing device has a hard disk, and records a desired television program when the vehicle is traveling. The in-vehicle information processing device determines whether or not recording is continued when the vehicle is stopped. When it is determined that recording is not continued and reproduction should be performed, the in-vehicle information processing device reproduces a television program which was recorded during driving. Thereby, the user can watch the television program which the user could not watch during driving.

Japanese Patent No. 3249845 (pages 2 to 4, FIG. 1) proposes a recording/reproduction device which can perform recording and reproduction simultaneously. The function of simultaneously performing recording and reproduction is called "chasing reproduction", which has been implemented in a hard disk recorder, a DVD-RAM recorder, and the like.

The in-vehicle information processing device described in Japanese Patent No. 3254946 (pages 2 to 4, FIG. 1) can record video during driving and reproduce the video during stopping, i.e., achieves time-shift reproduction. However, if the user wants to watch the entirety of a program, the user has to stay in the vehicle to watch the program after arriving at his or her destination.

The user may also program a videocassette recorder, a DVD recorder or the like at home to record a program in his or her absence. When being away from home, the user may start watching the program using the in-vehicle information processing device of Japanese Patent No. 3254946 (pages 2 to 4, FIG. 1), but stop watching partway through the program. After being back at home, if the user wants to watch the rest of the program, the user has to fast-forward through scenes which have already been watched of the program recorded in the in-home videocassette recorder or the like.

The user may happen to watch a program in a vehicle and want to watch the rest of the program at home. However, unless the timer was not preset to record the program, the user watches the rest of the program only after the user reaches a television set after getting off the vehicle. In this case, the user misses scenes which were broadcast during the time when the user moved from the vehicle to the television set.

Similarly, when the user wants to watch a television program which the user was watching at home, the user misses scenes which were broadcast during the time when the user moved from home to the vehicle.

Neither Japanese Patent No. 3254946 (pages 2 to 4, FIG. 1) nor Japanese Patent No. 3249845 (pages 2 to 4, FIG. 1) describes a method for solving the above-described problems.

BRIEF SUMMARY OF THE INVENTION

Therefore, an object of the present invention is to provide a recording/reproduction device, a recording/reproduction method, and a recording/reproduction system with which the rest of a program which was being watched in a vehicle can be watched at home without missing a scene.

Another object of the present invention is to provide a recording/reproduction device, a recording/reproduction method, and a recording/reproduction system with which the rest of a program which was being watched at home can be watched in a vehicle without missing a scene.

To achieve the above objects, the present invention has the following aspects.

A first aspect of the present invention is directed to a recording/reproduction system comprising an in-vehicle recording/reproduction device and a recording/reproduction device which receive the same signal and can communicate with each other. The in-vehicle recording/reproduction device is provided in a vehicle. The recording/reproduction device is provided outside the vehicle. The in-vehicle recording/reproduction device comprises a first recording device into which data can be recorded and from which the recorded data can be read out, a reproducing section operable to read and reproduce the data recorded in the first recording device, a recording information transmitting section operable to, when starting recording the data in the in-vehicle recording/reproduction device, transmit to the recording/reproduction device recording information about the data which the in-vehicle recording/reproduction device started recording, and a reproduction information transmitting section operable to transmit to the recording/reproduction device reproduction information indicating a point where reproduction was stopped. The recording/reproduction device comprises a second recording device capable of recording the same data as the data recorded in the in-vehicle recording/reproduction device based on the recording information transmitted from the in-vehicle recording/reproduction device, and a reproduction starting section operable to start reproduction from the position where reproduction was stopped in the in-vehicle recording/reproduction device based on the reproduction information from the in-vehicle recording/reproduction device.

Thereby, the same data is recorded in the recording/reproduction device and the in-vehicle recording/reproduction device. In addition, when reproduction is stopped in the in-vehicle recording/reproduction device, reproduction information indicating information when reproduction was stopped is transmitted to the recording/reproduction device, so that data recorded in the recording device can be reproduced from a position where reproduction was stopped. Therefore, for example, when the recording/reproduction device is installed at home, the rest of data which was being watched in a vehicle can be watched at home.

Preferably, the in-vehicle recording/reproduction device may further comprise an unrecorded data transmitting section operable to recognize a recording start position in the recording/reproduction device, and transmit to the recording/reproduction device data which has not been reproduced in the in-vehicle recording/reproduction device and has not been recorded in the recording/reproduction device.

Thereby, data which was not recorded in the recording/reproduction device due to a communication time lag can be stored in the recording/reproduction device.

Preferably, the in-vehicle recording/reproduction device may further comprise a data transmitting section operable to, after the recording information is transmitted, transmit to the recording/reproduction device data which is recorded for a predetermined time from start of recording. The recording/reproduction device may further comprise a data receiving/recording section operable to record the data transmitted from the data transmitting section so that the data is continuously linked to the data which has already been recorded in the recording/reproduction device.

Thereby, it is possible to avoid a situation in which a portion of data is not stored due to a communication time lag.

A second aspect of the present invention is directed to an in-vehicle recording/reproduction device which is installed in a vehicle and records and reproduces data based on an input signal, comprising a recording device into which the data can be recorded and from which the recorded data can be read out, a reproducing section operable to read and reproduce the data recorded in the recording device, a recording information transmitting section operable to, when starting recording the data in the in-vehicle recording/reproduction device, transmit to an external recording/reproduction device recording information about the data which the in-vehicle recording/reproduction device started recording, and a reproduction information transmitting section operable to transmit to the recording/reproduction device reproduction information indicating a position where reproduction was stopped.

Thereby, it is possible to record the same data as that recorded in the in-vehicle recording/reproduction device into an external recording/reproduction device, so that the rest of data which was being watched using the in-vehicle recording/reproduction device can be watched using the external recording/reproduction device.

Preferably, the reproduction information transmitting section may transmit the reproduction information before the vehicle is powered OFF.

Thereby, it is possible to transmit final reproduction information in a vehicle to an external recording/reproduction device with certainty.

Preferably, the reproduction information transmitting section may transmit the reproduction information every time reproduction is stopped.

Thereby, it is possible to transmit up-to-date reproduction information to an external recording/reproduction device.

Preferably, the in-vehicle recording/reproduction device may further comprise an unrecorded data transmitting section operable to recognize a recording start position in the recording/reproduction device, and transmit to the recording/reproduction device data which has not been reproduced in the in-vehicle recording/reproduction device and has not been recorded in the recording/reproduction device.

Thereby, it is possible to store data which was not recorded in an external recording/reproduction device due to a communication time lag into the external recording/reproduction device.

Preferably, the in-vehicle recording/reproduction device may further comprise a specialized button for activating at least one of the recording information transmitting section, the reproduction information transmitting section, and the unrecorded data transmitting section.

Thereby, it is possible for the user to more easily transmit recording information and reproduction information and data which has not been recorded in an external recording/reproduction device.

Preferably, a specialized menu for activating at least one of the recording information transmitting section, the reproduction information transmitting section, and the unrecorded data transmitting section, may be displayed on an operation screen for operating the in-vehicle recording/reproduction device.

Thereby, it is possible for the user to more easily transmit recording information and reproduction information and data which has not been recorded in an external recording/reproduction device.

A third aspect of the present invention is directed to a recording/reproduction device which can communicate with an in-vehicle recording/reproduction device installed in a vehicle and records and reproduces data based on an input signal, a recording section operable to receive recording information about the data transmitted from the in-vehicle recording/reproduction device, and record the data based on the recording information, and a reproduction starting section operable to receive reproduction information indicating a position where reproduction was stopped, the reproduction information being transmitted from the in-vehicle recording/reproduction device, and start reproduction based on the reproduction information.

Thereby, it is possible for the user to watch the rest of data which was watched using the in-vehicle recording/reproduction device, using the recording/reproduction device.

Preferably, the reproduction starting section may start reproduction from a position located a predetermined time before the reproduction position included in the reproduction information.

Thereby, it is possible for the user to confirm the contents which were watched before watching the rest of data which was being watched using the in-vehicle recording device.

Preferably, the recording/reproduction device may further comprise a specialized button for activating the reproduction starting section.

Thereby, it is possible for the user to easily watch the rest of data which was being watched using the in-vehicle recording/reproduction device, using the recording/reproduction device.

Preferably, a specialized menu for activating the reproduction starting section may be displayed on an operation screen for operating the recording/reproduction device.

Thereby, it is possible for the user to easily watch the rest of data which was being watched using the in-vehicle recording/reproduction device, using the recording/reproduction device.

Preferably, the recording/reproduction device may further comprise a deleting section operable to delete data before the position indicated by the reproduction information.

Thereby, data which has already been watched using the in-vehicle recording/reproduction device is deleted, so that a recording area can be efficiently utilized.

Preferably, the recording/reproduction device may further comprise a data receiving/recording section operable to receive and record data before a recording start position of the recording/reproduction device from the in-vehicle recording/reproduction device so that the data is continuously linked to the data which has already been recorded in the recording/reproduction device.

Thereby, it is possible to avoid a situation in which a portion of data is not stored due to a communication time lag.

A fourth aspect of the present invention is directed to, in a system comprising an in-vehicle recording/reproduction device and a recording/reproduction device which receive the same signal and can communicate with each other, a recording/reproduction method for reproducing in the recording/reproduction device the rest of the data which was being reproduced in the in-vehicle recording/reproduction device, the method comprising the steps of causing the in-vehicle recording/reproduction device to, when the in-vehicle recording/reproduction device starts recording the data, transmit to the recording/reproduction device recording information for causing the recording/reproduction device to record the same data, causing the recording/reproduction device to start recording the same data as the data recorded in the in-vehicle recording/reproduction device in accordance with the recording information from the in-vehicle recording/reproduction device, causing the in-vehicle recording/reproduction device to transmit to the recording/reproduction device reproduction information indicating a position where reproduction was stopped in the in-vehicle recording/reproduction device, and causing the recording/reproduction device to perform reproduction in accordance with the reproduction information from the in-vehicle recording/reproduction device.

A fifth aspect of the present invention is directed to a system comprising an in-vehicle recording/reproduction device and a recording/reproduction device which receive the same signal and can communicate with each other. The recording/reproduction device comprises a recording start command transmitting section operable to, when reproduction is stopped, periodically transmit a command to start recording to the in-vehicle recording/reproduction device, and a reproduction stop data recording section operable to start recording data for which reproduction was stopped, from a point where reproduction was stopped. The in-vehicle recording/reproduction device comprises an ACK recording information returning section operable to, when receiving the recording start command, start recording designated data and transmit ACK recording information indicating the reception and a point where recording of the data was started back to the recording/reproduction device. The recording/reproduction device further comprises an unrecorded data transmitting section operable to, when receiving the ACK recording information from the in-vehicle recording/reproduction device, transmit data until the point where recording of the data was started, the point being designated in the ACK recording information, to the in-vehicle recording/reproduction device. The in-vehicle recording/reproduction device further comprises a reproduction starting section operable to reproduce the data from the point where the recording/reproduction device started recording.

Thereby, data is recorded in the in-vehicle recording/reproduction device from a point where reproduction was stopped in the recording/reproduction device. Therefore, it is possible for the user to watch the rest of data which was being watched using the recording/reproduction device, using the in-vehicle recording/reproduction device.

Preferably, the in-vehicle recording/reproduction device may further comprise a data transmission request section operable to transmit to the recording/reproduction device a request for transmission of data ranging from a point where the recording/reproduction device started recording to a point where the in-vehicle recording/reproduction device started recording.

Thereby, data ranging from a position where reproduction was stopped in the recording/reproduction device until reproduction was started in the in-vehicle recording/reproduction device is transferred. Therefore, the user can watch the rest of data which was being watched using the recording/reproduction device, in a vehicle without missing any data.

A sixth aspect of the present invention is directed to a recording/reproduction device which can communicate with an in-vehicle recording/reproduction device installed in a vehicle and records and reproduces data based on an input signal. The recording/reproduction device comprises a recording start command transmitting section operable to, when reproduction is stopped, periodically transmit a command to start recording to the in-vehicle recording/reproduction device, and a reproduction stop data recording section operable to start recording data for which reproduction was stopped, from a point where reproduction was stopped. The in-vehicle recording/reproduction device comprises an ACK recording information returning section operable to, when receiving the recording start command, start recording designated data and transmit ACK recording information indicating the reception and a point where recording of the data was started back to the recording/reproduction device. The recording/reproduction device further comprises an unrecorded data transmitting section operable to, when receiving the ACK recording information from the in-vehicle recording/reproduction device, transmit data until the point where recording of the data was started, the point being designated in the ACK recording information, to the in-vehicle recording/reproduction device. The in-vehicle recording/reproduction device further comprises a reproduction starting section operable to reproduce the data from the point where the recording/reproduction device started recording.

Thereby, it is possible to watch the rest of data which was being watched using the recording/reproduction device, using the in-vehicle recording/reproduction device.

Preferably, a specialized button for activating at least one of the recording start command transmitting section, the reproduction stop data recording section, and the unrecorded data transmitting section may be further included.

Thereby, it is possible for the user to more easily transmit a recording start command, record data after reproduction is stopped, and transmit data which has not been recorded in an external device.

Preferably, at least one of the recording start command transmitting section, the reproduction stop data recording section, and the unrecorded data transmitting section may be automatically activated by the recording/reproduction device stopping reproduction.

Thereby, it is possible for the user to more easily transmit a recording start command, record data after reproduction is stopped, and transmit data which has not been recorded in an external device.

A seventh aspect of the present invention is directed to an in-vehicle recording/reproduction device which is installed in a vehicle and records and reproduces data based on an input signal. The in-vehicle recording/reproduction device comprises an ACK recording information returning section operable to, when receiving a recording start command from an external recording/reproduction device, start recording designated data and transmit ACK recording information indicating the reception and a point where recording of the data was started back to the recording/reproduction device, a data receiving/recording section operable to receive and record data ranging from when the recording/reproduction device started recording until when the in-vehicle recording/reproduction device started recording, the data being transmitted from the recording/reproduction device, and a reproduction starting section operable to reproduce the data received and recorded by the data receiving/recording section, from a head thereof.

Thereby, it is possible for the user to watch the rest of data which was being watched in an external recording/reproduction device, in a vehicle.

Preferably, a data transmission request section operable to transmit a request for transmission of data to be received by the data receiving/recording section, to the recording/reproduction device, may be further included.

Thereby, it is possible for the user to watch the rest of data which was being watched in an external recording/reproduction device, in a vehicle.

Preferably, a specialized button for activating the reproduction starting section may be further included.

Thereby, it is possible for the user to easily watch the rest of data which was being watched in an external recording/reproduction device, in a vehicle.

Preferably, a specialized menu for activating the reproduction starting section may be displayed on an operation screen for operating the in-vehicle recording/reproduction device.

Thereby, it is possible for the user to easily watch the rest of data which was being watched in an external recording/reproduction device, in a vehicle.

An eighth aspect of the present invention is directed to a recording/reproduction system comprising an in-vehicle recording/reproduction device and a recording/reproduction device which receive the same signal and can communicate with each other. The in-vehicle recording/reproduction device is provided in a vehicle. The recording/reproduction device is provided outside the vehicle. The in-vehicle recording/reproduction device comprises a first recording device into which data can be recorded and from which the recorded data can be read out, a first reproducing section and a second reproducing section operable to independently read and reproduce the data recorded in the first recording device, a recording information transmitting section operable to, when starting recording the data in the in-vehicle recording/reproduction device, transmit to the recording/reproduction device recording information about the data which the in-vehicle recording/reproduction device started recording, and a reproduction information transmitting section operable to transmit to the recording/reproduction device first and second reproduction information indicating points where reproduction was stopped in the first and second reproducing sections. The recording/reproduction device comprises a second recording device capable of recording the same data as the data recorded in the in-vehicle recording/reproduction device based on the first and second recording information transmitted from the in-vehicle recording/reproduction device, and a reproduction starting section operable to start reproduction from the position where reproduction was stopped in the in-vehicle recording/reproduction device based on the reproduction information from the first and second reproducing sections in the in-vehicle recording/reproduction device.

Thereby, it is possible to watch the rest of data which was being watched using the first and second reproducing sections, using the recording/reproduction device. Therefore, even when a program was watched on different displays in a vehicle, the respective rests of the program can be watched using an external recording/reproduction device.

Preferably, the first recording device may record a program which is to be reproduced in the first and second reproducing sections. The first and second reproducing sections may independently reproduce the program recorded in the first recording device. The recording information transmitting section may transmit information about the program recorded in the first recording device as recording information. The second recording device may record a program based on the recording information transmitted from the in-vehicle recording/ reproduction device. The reproduction starting section may start reproducing the program based on the first or second reproduction information from the in-vehicle recording/reproduction device, from a position where reproduction was stopped in the first or second reproducing sections of the in-vehicle recording/reproduction device.

Thereby, when the same program was reproduced in the first and second reproducing sections, any of the rests of the program which was being watched using the first and second reproducing sections can be watched using the recording/ reproduction device.

Preferably, the first recording device may record two different programs which are to be reproduced in the first and second reproducing sections. The first and second reproducing sections may independently reproduce the two programs recorded in the first recording device, respectively. The recording information transmitting section may transmit information about the two programs recorded in the first recording device as recording information. The second recording device may record the two programs based on the recording information transmitted from the in-vehicle recording/reproduction device. The reproduction starting section may start reproducing the program which was reproduced in the first or second reproducing section from a position where reproduction was stopped in the first or second reproducing section of the in-vehicle recording/reproduction device based on the first or second reproduction information from the in-vehicle recording/reproduction device.

Thereby, when different programs are reproduced in the first and second reproducing sections, the rest of either the programs which were being watched using the first and second reproducing sections can be watched using the recording/ reproduction device.

A ninth aspect of the present invention is directed to an in-vehicle recording/reproduction device which is installed in a vehicle and records and reproduces data based on an input signal. The in-vehicle recording/reproduction device comprises a first recording device into which data can be recorded and from which the recorded data can be read out, a first reproducing section and a second reproducing section operable to independently read and reproduce the data recorded in the first recording device, a recording information transmitting section operable to, when starting recording the data in the in-vehicle recording/reproduction device, transmit to an external recording/reproduction device recording information about the data which the in-vehicle recording/reproduction device started recording, and a reproduction information transmitting section operable to transmit to the recording/ reproduction device first and second reproduction information indicating points where reproduction was stopped in the first and second reproducing sections.

Thereby, the rest of either of the programs which were being watched using the first and second reproducing sections can be watched using the recording/reproduction device.

Preferably, the first recording device may record a program which is to be reproduced in the first and second reproducing sections. The first and second reproducing sections may independently reproduce the program recorded in the first recording device. The recording information transmitting section may transmit information about the program recorded in the first recording device as recording information.

Thereby, when the same program was reproduced in the first and second reproducing sections, the rest of either program which was being watched using the first and second reproducing sections can be watched using the recording/ reproduction device.

Preferably, the first recording device may record two different programs which are to be reproduced in the first and second reproducing sections. The first and second reproducing sections may independently reproduce the two programs recorded in the first recording device, respectively. The recording information transmitting section may transmit information about the two programs recorded in the first recording device as recording information.

Thereby, when different programs are reproduced in the first and second reproducing sections, the rest of either of the programs which were being watched using the first and second reproducing sections can be watched using the recording/reproduction device.

Preferably, a specialized button for activating at least one of the recording information transmitting section and the reproduction information transmitting section may be further included.

Thereby, it is possible for the user to more easily transmit recording information and reproduction information.

Preferably, a specialized menu for activating at least one of the recording information transmitting section and the reproduction information transmitting section may be displayed on an operation screen for operating the in-vehicle recording/reproduction device.

Thereby, it is possible for the user to more easily transmit recording information and reproduction information.

A tenth aspect of the present invention is directed to a recording/reproduction device which can communicate with an in-vehicle recording/reproduction device installed in a vehicle and records and reproduces data based on an input signal. The recording/reproduction device comprises a recording device capable of recording the same data as data recorded in the in-vehicle recording/reproduction device based on recording information transmitted from the in-vehicle recording/reproduction device, and a reproduction starting section operable to start reproduction from a position where reproduction was stopped in a first reproducing section and a second reproducing section of the in-vehicle recording/reproduction device based on first and second reproduction information from the in-vehicle recording/reproduction device.

Thereby, even when a program was being watched on different displays in the in-vehicle recording/reproduction device, the respective rests of the program can be watched, using the recording/reproduction device.

Preferably, the recording device may record a program designated in the recording information. The reproduction starting section may start reproducing the program from a position where reproduction was stopped in the first and second reproducing sections of the in-vehicle recording/reproduction device based on the first or second reproduction information from the in-vehicle recording/reproduction device.

Thereby, even when the same program was watched on different displays using the in-vehicle recording/reproduction device, the respective rests of the program can be watched using the recording/reproduction device.

Preferably, the recording device may record two different programs designated in the recording information. The reproduction starting section may start reproducing a program which was reproduced in the first or second reproducing section from a position where reproduction was stopped in the first or second reproducing section of the in-vehicle recording/reproduction device, based on the first or second reproduction information from the in-vehicle recording/reproduction device.

Thereby, even when different programs were being watched on different displays using the in-vehicle recording/reproduction device, the respective rests of the programs can be watched using the recording/reproduction device.

Preferably, a specialized button for activating the reproduction starting section may be further included.

Thereby, it is possible for the user to more easily watch the rest of a program which was being watched using the in-vehicle recording/reproduction device, using the recording/reproduction device.

Preferably, a specialized menu for activating the reproduction starting section may be displayed on an operation screen for operating the recording/reproduction device.

Thereby, it is possible for the user to more easily watch the rest of a program which was being watched using the in-vehicle recording/reproduction device, using the recording/reproduction device.

An eleventh aspect of the present invention is directed to, in a system comprising an in-vehicle recording/reproduction device and a recording/reproduction device which receive the same signal and can communicate with each other, a method for reproducing the rest of data which was reproduced in the recording/reproduction device, in the in-vehicle recording/reproduction device. The method comprises the steps of, when the recording/reproduction device stops reproduction, causing the recording/reproduction device to periodically transmit a command to start recording to the in-vehicle recording/reproduction device, causing the recording/reproduction device to start recording data for which reproduction was stopped, from a time point where the recording/reproduction device stopped reproduction, causing the in-vehicle recording/reproduction device to, when receiving the recording start command, start recording designated data and transmitting ACK recording information indicating the reception and a point where recording of the data was started back to the recording/reproduction device, causing the recording/reproduction device to, when receiving the ACK recording information from the in-vehicle recording/reproduction device, transmit data until the point where recording of the data was started, the point being designated in the ACK recording information, to the in-vehicle recording/reproduction device, and causing the in-vehicle recording/reproduction device to receive data transmitted from the recording/reproduction device and reproduce the received data from a head thereof.

A twelfth aspect of the present invention is directed to, in a recording/reproduction system comprising an in-vehicle recording/reproduction device and a recording/reproduction device which receive the same signal and can communicate with each other, a method for reproducing the rest of data which was being reproduced in the in-vehicle recording/reproduction device, in the recording/reproduction device. The in-vehicle recording/reproduction device can reproduce recorded data in first and second reproducing sections independently. The method comprises the steps of causing the in-vehicle recording/reproduction device to, when starting recording a program in the in-vehicle recording/reproduction device, transmit recording information about data for which recording was started in the in-vehicle recording/reproduction device, to the recording/reproduction device, causing the in-vehicle recording/reproduction device to transmit first and second reproduction information indicating points where reproduction of the first and second reproducing sections was stopped, to the recording/reproduction device, causing the recording/reproduction device to record the same data as the data recorded in the in-vehicle recording/reproduction device based on recording information transmitted from the in-vehicle recording/reproduction device, and causing the recording/reproduction device to start reproduction from a position where reproduction was stopped in the first or second reproducing section of the in-vehicle recording/reproduction device based on the first or second reproduction information from the in-vehicle recording/reproduction device.

Preferably, the in-vehicle recording/reproduction device may record a program which is to be reproduced in the first and second reproducing sections. In the step of transmitting the recording information, the in-vehicle recording/reproduction device may transmit information about the program as recording information. In the step of causing the recording/reproduction device to perform recording, the recording/reproduction device may record a program based on the recording information transmitted from the in-vehicle recording/reproduction device. In the step of starting reproduction, the recording/reproduction device may start reproducing a program from a position where reproduction was stopped in the first or second reproducing section of the in-vehicle recording/reproduction device based on the first or second reproduction information from the in-vehicle recording/reproduction device.

Preferably, the in-vehicle recording/reproduction device may record two different programs which are to be reproduced in the first and second reproducing sections. In the step of transmitting the recording information, information about the two programs may be transmitted as the recording information. In the step of causing the recording/reproduction device to perform recording, the two programs may be recorded based on the recording information transmitted from the in-vehicle recording/reproduction device. In the step of starting reproduction, the recording/reproduction device may start reproducing a program which was reproduced in the first or second reproducing section from a position where reproduction was stopped in the first or second reproducing section of the in-vehicle recording/reproduction device, based on the first or second reproduction information from the in-vehicle recording/reproduction device.

Thus, according to the in-vehicle recording/reproduction device, the recording/reproduction device, the recording/reproduction system, and the recording/reproduction method of the present invention, the rest of data which was being watched in an in-vehicle device can be watched in an external device without missing a scene. Alternatively, the rest of data which was watched in the external device can be watched in the in-vehicle device without missing a scene.

A thirteenth aspect of the present invention is directed to an in-vehicle recording/reproduction device which records and reproduces data based on an input signal. The in-vehicle recording/reproduction device comprises a recording device which uses a recording medium allowing random access and writes data onto the recording medium while reading the written data from the recording medium, a reproducing section for reproducing data read out by the recording device, and a control section for controlling data reproduction. The control section comprises a watching permission determining section operable to determine whether or not the user is permitted to watch in a vehicle, based on information about a traveling state of the vehicle, the information being externally supplied, a temporarily stopping section operable to temporarily stop reading of data by the recording device when the watching permission determining section determines that watching is not permitted, and a reproduction starting section operable to cause the recording device to read data and cause the reproducing section to reproduce the data, from a position where reproduction was temporarily stopped, when the watching permission determining section determines that watching is permitted.

Thereby, the in-vehicle recording/reproduction device automatically determines whether or not watching is permitted in a vehicle, based on the externally supplied information about the traveling state of the vehicle. When it is determined that watching is not permitted, the in-vehicle recording/reproduction device temporarily stops reproduction. On the other hand, when it is determined that watching is permitted, the in-vehicle recording/reproduction device starts reproduction from a point where reproduction was temporarily stopped. Therefore, even in a situation in which watching is not always and continuously permitted, such as driving a vehicle, the user can watch the contents of data intermittently but without missing any data. For example, when the input signal is a television signal, the user can watch scenes of a television program intermittently without missing a scene.

Preferably, the control section may extract a specific scene from data to be written into the recording device and cause the reproducing section to reproduce the specific scene with priority.

Thereby, the specific scene is reproduced with priority, so that the user can enjoy watching data while reducing a time required for reproduction.

For example, the control section may determine the specific scene based on a video signal and/or an audio signal contained in the input signal.

Thereby, it is possible to reproduce only an exciting scene or perform reproduction without commercials, so that the user can enjoy watching data while reducing a time required for reproduction.

BRIEF DESCRIPTION OF THE DRAWINGS

FIG. 1 is a functional block diagram illustrating a structure of an in-vehicle recording/reproduction device 101 according to a first embodiment of the present invention.

DETAILED DESCRIPTION OF THE INVENTION

Figure 2:
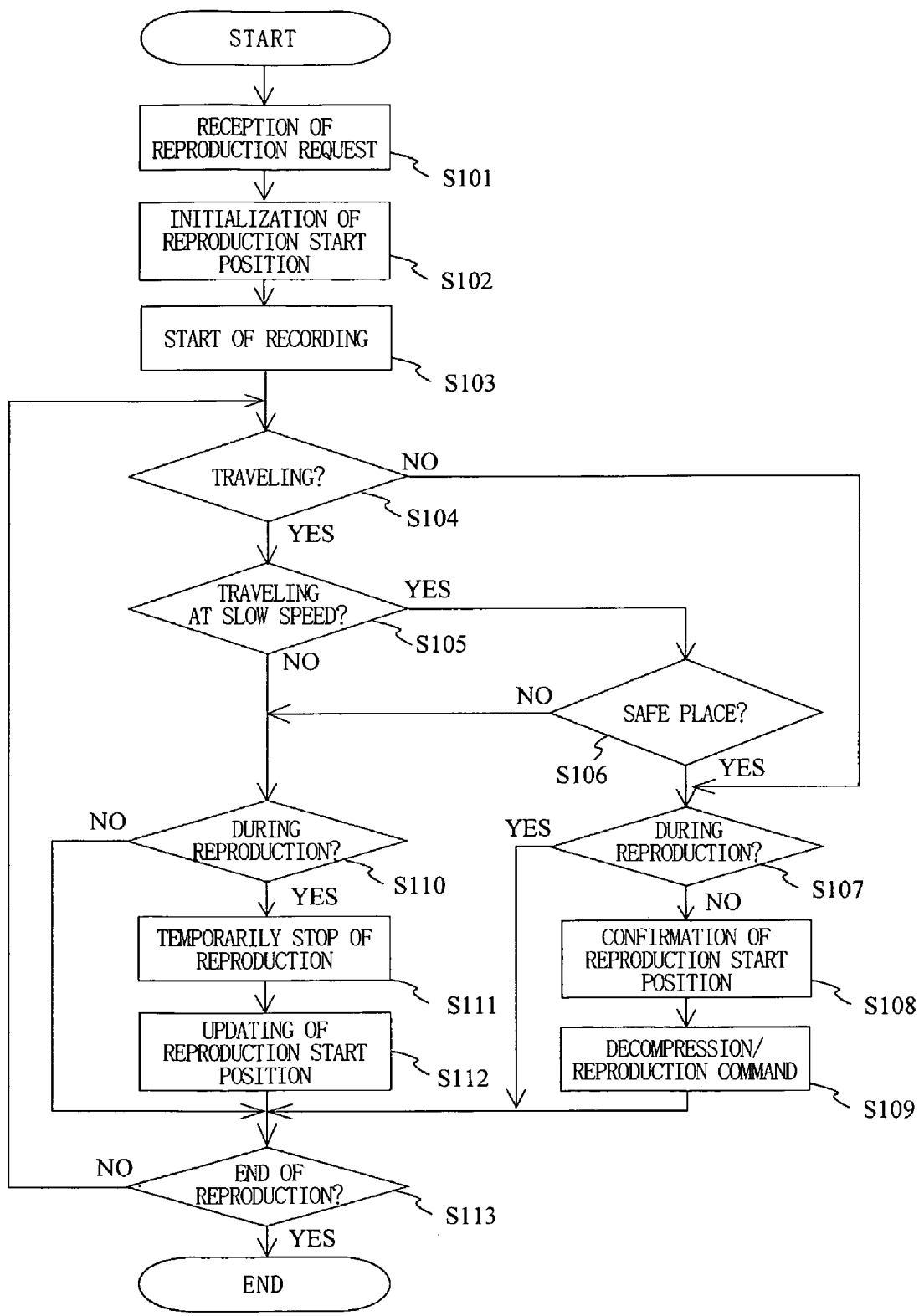
FIG. 2 is a flowchart illustrating an operation of a control section 106 when the user issues a command to perform reproduction.

Hereinafter, in-vehicle recording/reproduction devices, recording/reproduction devices, and recording/reproduction systems according to embodiments of the present invention will be described with the accompanying drawings.

First Embodiment

FIG. 1 is a functional block diagram illustrating a structure of an in-vehicle recording/reproduction device 101 according to a first embodiment of the present invention. In the first embodiment, a recording/reproduction device is provided with which a television program can be watched without missing a scene when the television program is watched in a vehicle.

In FIG. 1, the in-vehicle recording/reproduction device 101 comprises a compressing section 102, a recording device 103, a decompressing section 104, a reproducing section 105, and a control section 106.

The compressing section 102 compresses an input signal to generate a signal having a reduced data amount, and inputs the signal to the recording device 103. In the first embodiment, the input signal is assumed to be a television broadcast signal (hereinafter referred to as a television signal). The television signal is assumed to include a video signal and an audio signal.

The recording device 103 stores compressed data generated by the compressing section 102. The recording device 103 is, for example, a hard disk drive or the like, which can simultaneously perform a write operation and a read operation. When a recording medium, such as a hard disk, which allows random access is used, it is possible to provide a recording device which can perform reproduction while recording by switching a write process and a read process quickly. Such a recording device has already been commercialized and will not be further explained.

The decompressing section 104 reads out compressed data from the recording device 103 and decompresses the read compressed data to generate a television signal.

The reproducing section 105 reproduces and displays the television signal generated by the decompressing section 104. For example, the reproducing section 105 displays a video signal on a liquid crystal display and outputs an audio signal through a loudspeaker after the audio signal is amplified using an amplifier.

The control section 106 receives, as control signals, a command signal generated by the user's command operation, a signal from a vehicle-speed sensor (not shown) installed in a vehicle, a signal indicating positional information from a GPS (Global Positioning System) receiving device (not shown), a signal indicating traffic information from a VICS (Vehicle Information and Communication System) receiving device (not shown), and the like. Based on the received control signal, the control section 106 controls the compressing section 102, the recording device 103, and the decompressing section 104 so that a television signal is recorded and/or reproduced.

Firstly, a description will be given of a series of operations until a television signal input to the in-vehicle recording/reproduction device 101 is reproduced. The television signal is received by a television antenna (not shown) installed on a vehicle, is converted into a digital signal by an A/D converter (not shown), and is input to the compressing section 102.

The compressing section 102 receives the television signal which has been converted into the digital signal, and converts the digital signal into compressed data using a compression technique, such as MPEG-2 (Moving Picture Experts Group phase-2) or the like. Hereinafter, the compressed data is referred to as compressed television data.

The compressed television data output from the compressing section 102 is written onto a recording medium (not shown) in the recording device 103. It is here assumed that, as the recording medium, a hard disk is used, which can store a large amount of data and allows random access. The recording device 103 can record the compressed television data even during driving. The recording device 103 records the compressed television data until a preset time (timer recording) or until a command to stop recording is input from the control section 106. Under other conditions, the recording device 103 continues to perform recording as long as there is free space on the recording medium.

When receiving a command to perform reproduction from the control section 106, the decompressing section 104 reads out compressed television data from the recording device 103 and decompresses the data. The thus-decompressed compressed television data is a digital signal.

Since the recording device 103 is assumed to be a hard disk which allows random access, the user can select a favorite program from a plurality of programs and cause his or her desired program or scene to be reproduced from some midpoint in the program.

The digital signal output from the decompressing section 104 is converted into an analog signal by a D/A converter (not shown). Thereby, a television signal is reproduced. Hereinafter, the phrase "the decompressing section 104 generates a television signal" means that an analog television signal is generated after conversion by the D/A converter. The reproducing section 105 reproduces the generated television signal to output a video or an audio signal.

During the time when the vehicle is traveling, for example, the control section 106 causes the reproducing section 105 to display a car navigation guide (a control system for car navigation is not shown). When the user is permitted to watch television and there is a request for reproduction from the driver, the control section 106 causes the decompressing section 104 to decompress compressed television data and causes the reproducing section 105 to display a video.

FIG. 2 is a flowchart illustrating an operation of the control section 106 when the user issues a command to perform reproduction. Hereinafter, the operation of the control section 106 when the user issues a command to perform reproduction will be described with reference to FIG. 2.

Initially, the control section 106 receives a request for reproduction (step S101). Next, the control section 106 initializes a reproduction start position (step S102). As used herein, the reproduction start position indicates a starting position of compressed television data when reproduction is performed. In other words, the reproduction start position indicates a tail-end position of compressed television data which has already been reproduced. By initialization in step S102, the reproduction start position is set to be a head position of compressed television data. The control section 106 stores the reproduction start position in a memory (not shown).

Next, the control section 106 commands the recording device 103 to record compressed television data of a program desired by the user, i.e., to start recording the program (step S103). Next, the control section 106 receives a signal from a vehicle-speed sensor (not shown) and determines whether or not the vehicle is traveling (step S104).

When the vehicle is not traveling, the control section 106 determines whether or not reproduction is being performed (step S107). When reproduction is being performed, the control section 106 goes to an operation of step S113. On the other hand, when reproduction is not being performed, the control section 106 confirms a current reproduction start position (step S108), commands the decompressing section 104 to read out and decompress compressed television data recorded in the recording device 103 from the reproduction start position, and causes the reproducing section 105 to reproduce the decompressed television signal (step S109), and goes to the operation of step S113.

On the other hand, when it is determined in step S104 that the vehicle is traveling, the control section 106 receives a signal from the vehicle-speed sensor (not shown) and determines whether or not the vehicle is traveling at a slow speed (step S105). When the vehicle is traveling at a slow speed, the control section 106 receives information from a GPS receiving device (not shown) and/or a VICS receiving device (not shown) and determines whether or not a current location is a safe place (step S106). When it is determined that the current location is a safe place, the control section 106 goes to an operation of step S107. On the other hand, when it is determined that the current location is not safe, the control section 106 goes to an operation of step S110.

When determining whether or not the current location is a safe place, for example, the control section 106 may utilize map information of a car navigation system (not shown) and vehicle positional information from a GPS device (not shown) to determine that, for example, a mountain road having a number of curves is a dangerous place. Alternatively, the control section 106 may obtain traffic congestion information based on information from a VICS receiving device (not shown) and determine that the current location is a safe place because traffic congestion causes alternation of traveling at a slow speed and stopping.

On the other hand, when it is determined in the operation of step S105 that the vehicle is not traveling at a slow speed, the control section 106 goes to the operation of step S110.

In the operation of step S110, the control section 106 determines whether or not reproduction is being performed. When reproduction is being performed, the control section 106 temporarily stops reproduction (step S111) and stores a position at which reproduction is temporarily stopped as a new reproduction start position to update the reproduction start position stored in the memory (not shown) (step S112), and goes to an operation of step S113. After temporarily stopping reproduction, the control section 106 controls an audio device (not shown) to display a road guidance by car navigation, reproduce music, or reproduce only television audio.

On the other hand, if it is determined in the operation of step S110 that reproduction is not being performed, the control section 106 goes to the operation of step S113.

In the operation of step S113, the control section 106 determines whether or not reproduction is ended. The determination may be based on a command from the user, on whether or not recording of a desired program has been ended, or on whether or not a predetermined recording time has been elapsed.

When reproduction is not ended, the control section 106 returns to the operation of step S104. On the other hand, when reproduction is ended, the control section 106 ends the process.

As described above, the in-vehicle recording/reproduction device of the first embodiment of the present invention detects a traveling situation of a vehicle while recording a desired program to determine whether or not a current situation is safe enough that the driver can drive safely. When it is not a safe situation, the in-vehicle recording/reproduction device temporarily stops reproducing a program and stores a position at which reproduction is temporarily stopped as a reproduction start position. When it is a safe situation, the in-vehicle recording/reproduction device reproduces a desired program based on the stored reproduction start position without missing a scene. Therefore, it is possible to watch a desired program in a vehicle without missing a scene even during driving.

Note that the operation of the control section 106 is not limited to the operation of the flowchart of FIG. 2. Hereinafter, another operation of the control section 106 will be described with reference to FIGS. 3 and 4.

Figure 3:
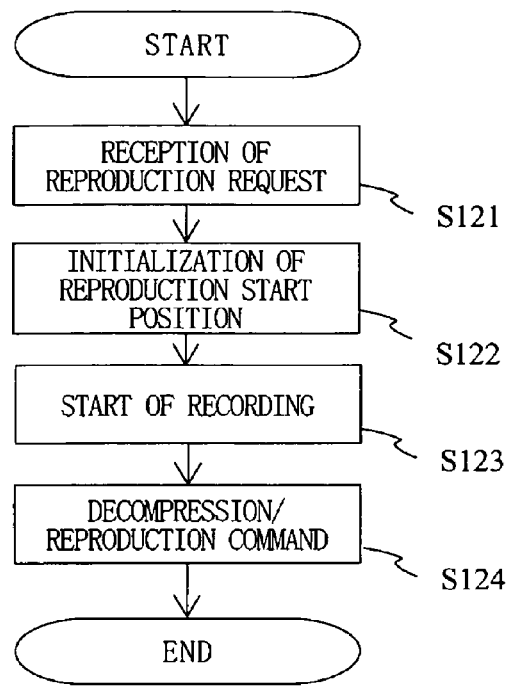
FIG. 3 is a flowchart illustrating a reproduction operation of the control section 106 when receiving a reproduction command from the user.

FIG. 3 is a flowchart illustrating a reproduction operation of the control section 106 when receiving a reproduction command from the user. Initially, the control section 106 receives a reproduction request (step S121) and initializes a reproduction start position (step S122). Next, the control section 106 commands the recording device 103 to record compressed television data of a program desired by the user, i.e., causes the recording device 103 to start recording the program (step S123). Next, the control section 106 commands the decompressing section 109 to decompress the compressed television data recorded by the recording device 103, causes the reproducing section 105 to reproduce the data (step S124), and ends the process. Thereby, recording and reproduction of the desired program are started.

Figure 4:
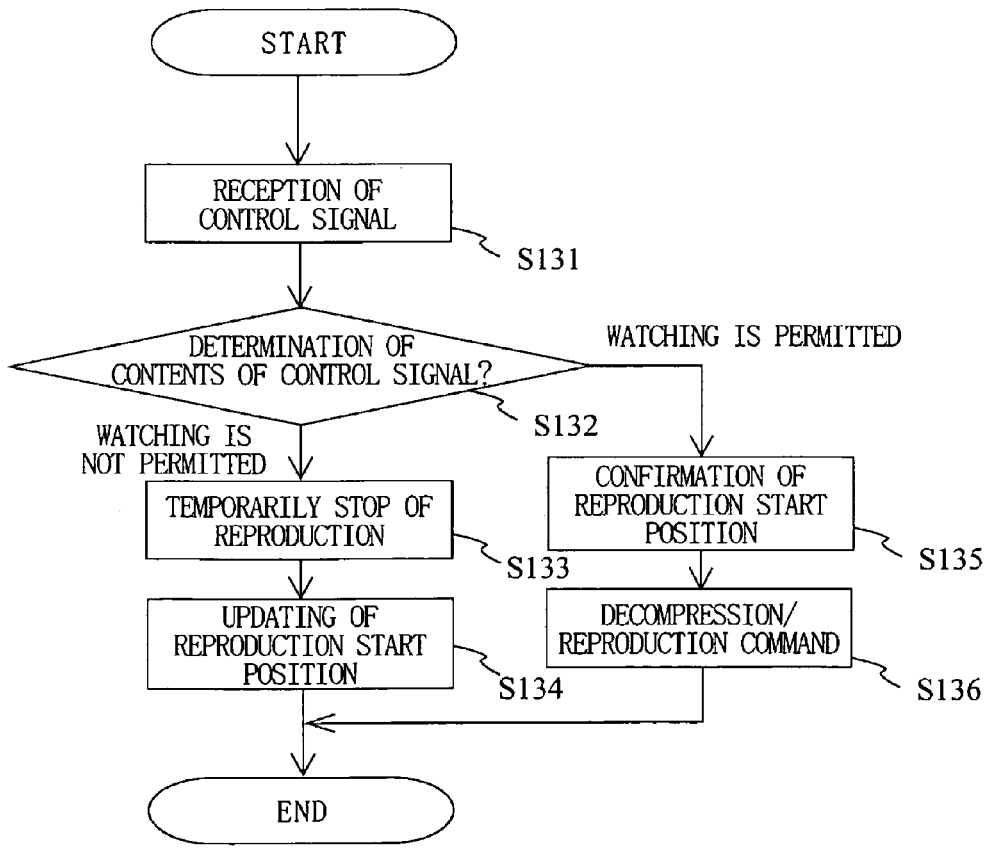
FIG. 4 is a flowchart illustrating a reproduction control operation of the control section 106 when a control signal is received during a recording operation.

FIG. 4 is a flowchart illustrating a reproduction control operation of the control section 106 when a control signal is received during a recording operation. Initially, the control section 106 receives a control signal (step S131). Next, the control section 106 recognizes the contents of the received control signal to determine whether or not a current situation is safe enough that watching can be permitted (step S132). Specifically, as illustrated in steps S104 to S106 of FIG. 2, based on a control signal from a vehicle-speed sensor (not shown), a GPS receiving device (not shown), a VICS receiving device (not shown) or the like, it is determined whether or not the contents of the control signal indicate permission of reproduction. Alternatively, the control section 106 may recognize whether the vehicle was stopped or started being driven to determine permission of watching, based on a control signal indicating stopping and a control signal indicating a start of driving from a vehicle-speed sensor (not shown).

When it is determined that watching is not permitted, the control section 106 commands the decompressing section 104 to temporarily stop decompression, i.e., temporarily stop reproduction (step S133), and updates the reproduction start position (step S134), and ends the process.

On the other hand, when it is determined that watching is permitted, the control section 106 confirms the reproduction start position (step S135), causes the decompressing section 104 to perform decompression from the reproduction start position, and starts reproduction (step S136), and ends the process.

When the control section 106 operates each process as illustrated in FIGS. 3 and 4, the in-vehicle recording/reproduction device 101 can reproduce a desired program without missing a scene every time a safe situation is encountered, such as, for example, when the vehicle is stopped.

Although the input signal is assumed to be a television signal in the first embodiment, the present invention is not limited to this. For example, a similar system may be constructed, except that data containing a video signal, such as, for example, a video captured by an in-vehicle camera, is received as an input signal.

When a DVD-Video, a television program which has already been recorded, or the like is reproduced, the in-vehicle recording/reproduction device may reproduce the DVD-Video, the television program which has already been recorded, or the like without missing a scene when a safe situation is encountered. In this case, a recording operation is not required, and therefore, the in-vehicle recording/reproduction device may control only reproduction. Specifically, in the control section 106, it is determined whether or not a current situation permits reproduction. When reproduction is not permitted, a control process is performed, such as, for example, temporarily stopping reproduction. Alternatively, a similar system may be constructed and applied to streaming (distribution of contents) on the Internet or the like.

In the first embodiment, a television signal includes a video signal and an audio signal. The present invention is not limited to this. For example, even when a television signal includes a character broadcast signal or the like, a similar system can be implemented.

In the first embodiment, the recording device 103 is assumed to be a hard disk drive. The present invention is not limited to this. For example, when the recording device 103 is a recording medium which allows random access, such as a semiconductor memory, a DVD-RAM, or the like, a similar system can be implemented.

In the first embodiment, an input signal is compressed and stored in a recording medium, and is decompressed and reproduced. The present invention is not limited to this. When a recording medium has a sufficient capacity, a similar system may be constructed without the compressing section and the decompressing section.

In the first embodiment, watching is permitted when a current situation is not dangerous during traveling at a slow speed. Determination of whether or not the current situation is dangerous is not limited to that described in the first embodiment. Watching may be permitted in any situation in which the driver can keep driving safely.

In the first embodiment, a program is reproduced without missing a scene. Alternatively, in order to utilize time efficiently, for example, only particular exciting scenes, such as, for example, scoring scenes in a broadcast baseball game, may be extracted and reproduced with priority. Specifically, the in-vehicle recording/reproduction device may detect an output level of an audio signal and, for example, based on a level of cheer, determine whether or not a scene is an exciting scene. When the cheer level is higher than or equal to a predetermined level, it may be determined that the scene is a desired scene. In this case, only such a scene may be extracted and reproduced. Alternatively, the in-vehicle recording/reproduction device may detect information contained in a video signal to determine whether or not a scene is a desired scene which a program producer wants the audience to watch, and extract and reproduce only the desired scene. Alternatively, the in-vehicle recording/reproduction device may detect information contained in a video signal to determine whether or not a scene is a commercial scene, and assuming that scenes other than commercials are desired scenes, extract and reproduce only the desired scenes. Thereby, it is possible to utilize time efficiently.

Figure 5:
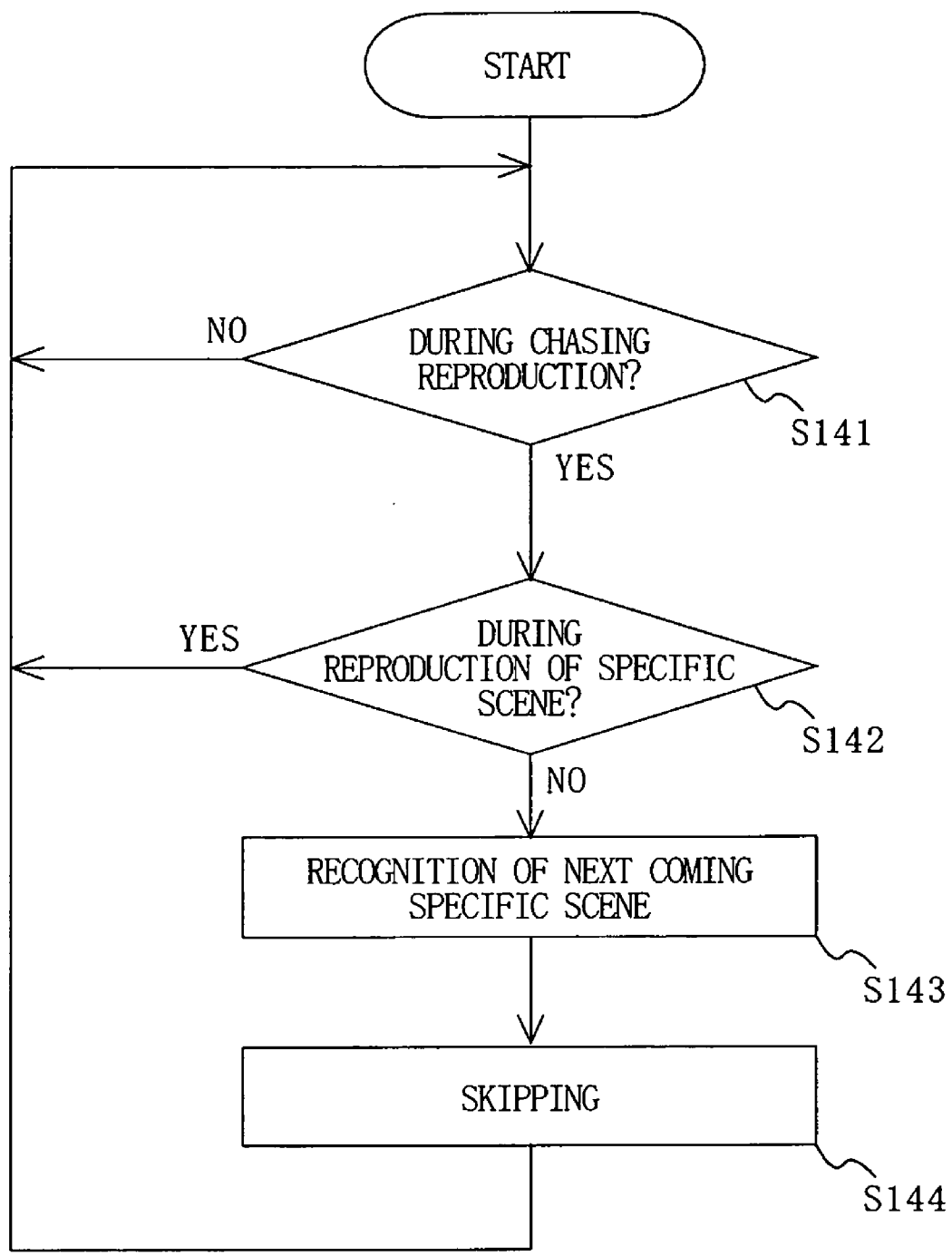
FIG. 5 is a flowchart illustrating an operation of the control section 106 when only a specific scene is extracted and reproduced.

FIG. 5 is a flowchart illustrating an operation of the control section 106 when only a specific scene is extracted and reproduced. Hereinafter, the operation of the control section 106 in which only a specific scene is extracted and reproduced will be described with reference to FIG. 5. The operation of FIG. 5 is performed in parallel to the process of step S109 of FIG. 2 or step S124 of FIG. 3.

Initially, the control section 106 determines whether or not chasing reproduction is being performed with respect to a program which is being recorded into the recording device 103 (step S141). When chasing reproduction is not being performed, the control section 106 returns to the operation of step S141. On the other hand, when chasing reproduction is being performed, the control section 106 determines whether or not a specific scene is being reproduced (step S142).

When the specific scene is being reproduced, the process returns to the operation of step S141. On the other hand, when the specific scene is not being reproduced, the control section 106 recognizes the next coming specific scene (step S143). Specifically, the control section 106 recognizes the next coming specific scene by, for example, reading information contained in a video signal in advance or reading only an audio level in advance. Next, the control section 106 commands the decompressing section 104 to skip scenes of the currently reproduced program until the next coming specific scene thus recognized (step S144), and returns to the operation of step S141.

The specific scene may be recognized by a recognition method based on an audio output level or a recognition method based on information contained in a video signal as described above. Alternatively, any method which can recognize a specific scene may be used.

Note that the user may store a recorded program into a removable medium or the like, bring the medium out of a vehicle, and reproduce the program. Alternatively, if the in-vehicle recording/reproduction device and an in-home recording/reproduction device can communicate with each other, the user can download a recorded program from the in-vehicle recording/reproduction device to the in-home recording/reproduction device to reproduce the desired program.

Second Embodiment

In a second embodiment, a recording/reproduction system will be described in which, when the user drives a vehicle back home, the rest of a television program which was being watched in the vehicle can be watched at home without missing a scene.

Figure 6:
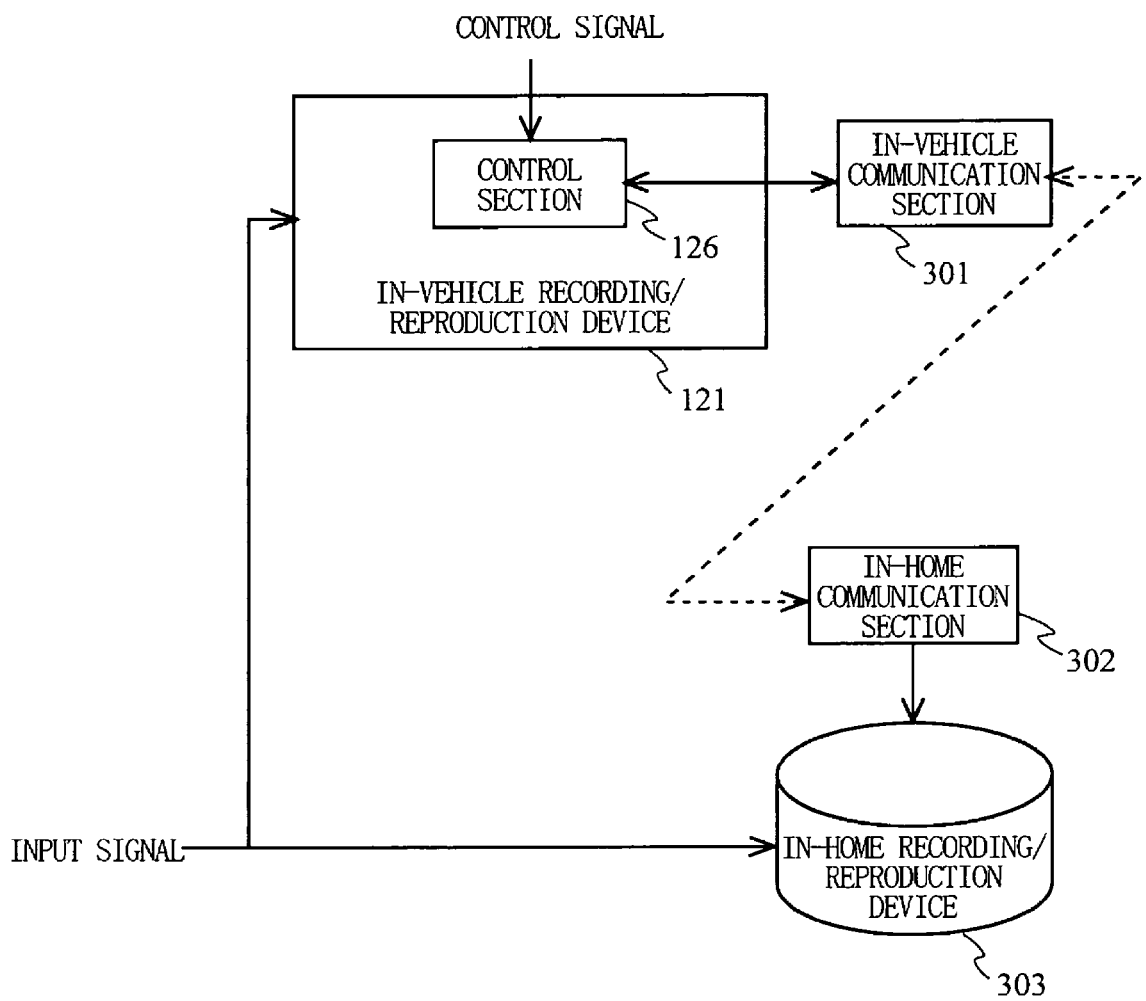
FIG. 6 is a diagram illustrating a structure of a recording/reproduction system according to a second embodiment of the present invention.

FIG. 6 is a diagram illustrating a structure of a recording/reproduction system according to a second embodiment of the present invention. In FIG. 6, the recording/reproduction system comprises an in-vehicle recording/reproduction device 121, an in-vehicle communication section 301, an in-home communication section 302, and an in-home recording/reproduction device 303. The in-vehicle recording/reproduction device 121 comprises a control section 126, a compressing section (not shown), a recording device (not shown), a decompressing section (not shown), and a reproducing section (not shown). Note that the control section 126 corresponds to the control section 106 of the first embodiment. The portions other than the control section 126 have functions similar to those of the first embodiment and are not illustrated in FIG. 6.

The in-vehicle communication section 301 communicates with the control section 126 and, in addition, with an external communication device via the Internet (not shown) or the like. The in-home communication section 302 communicates with an external communication device via the Internet (not shown) or the like. It is herein assumed that the in-vehicle communication section 301 and the in-home communication section 302 communicate with each other.

The in-home recording/reproduction device 303 and the in-vehicle recording/reproduction device 121 receive a television signal as an input signal.

The in-vehicle recording/reproduction device 121 records and/or reproduces the input television signal.

The control section 126 commands the in-home recording/reproduction device 303 to record the television signal, as required. Hereinafter, information transmitted along with the command is referred to as recording information. The recording information includes, for example, information indicating what program is to be recorded and what times are the start and stop times of a recording session thereof. The control section 126 transmits reproduction information to the in-home recording/reproduction device 303, as required. The reproduction information herein refers to information indicating what program and which scene thereof were last reproduced in the in-vehicle recording/reproduction device 121.

The in-home recording/reproduction device 303 includes a hard disk (not shown) as a recording medium, and records and/or reproduces an input television signal in accordance with a command from the user and/or the in-vehicle recording/reproduction device 121. The in-home recording/reproduction device 303 starts recording when receiving recording information from the in-vehicle recording/reproduction device 121. The in-home recording/reproduction device 303 continues to record the program as long as a specific command is not received from the in-vehicle recording/reproduction device 121 or the user. The in-home recording/reproduction device 303 stores the reproduction information from the in-vehicle recording/reproduction device 121, and manages what program and which scene thereof the user last stopped watching in a vehicle. The in-home recording/reproduction device 303 reproduces the rest of the program which the user watched in the vehicle, based on the stored reproduction information.

Figure 7:
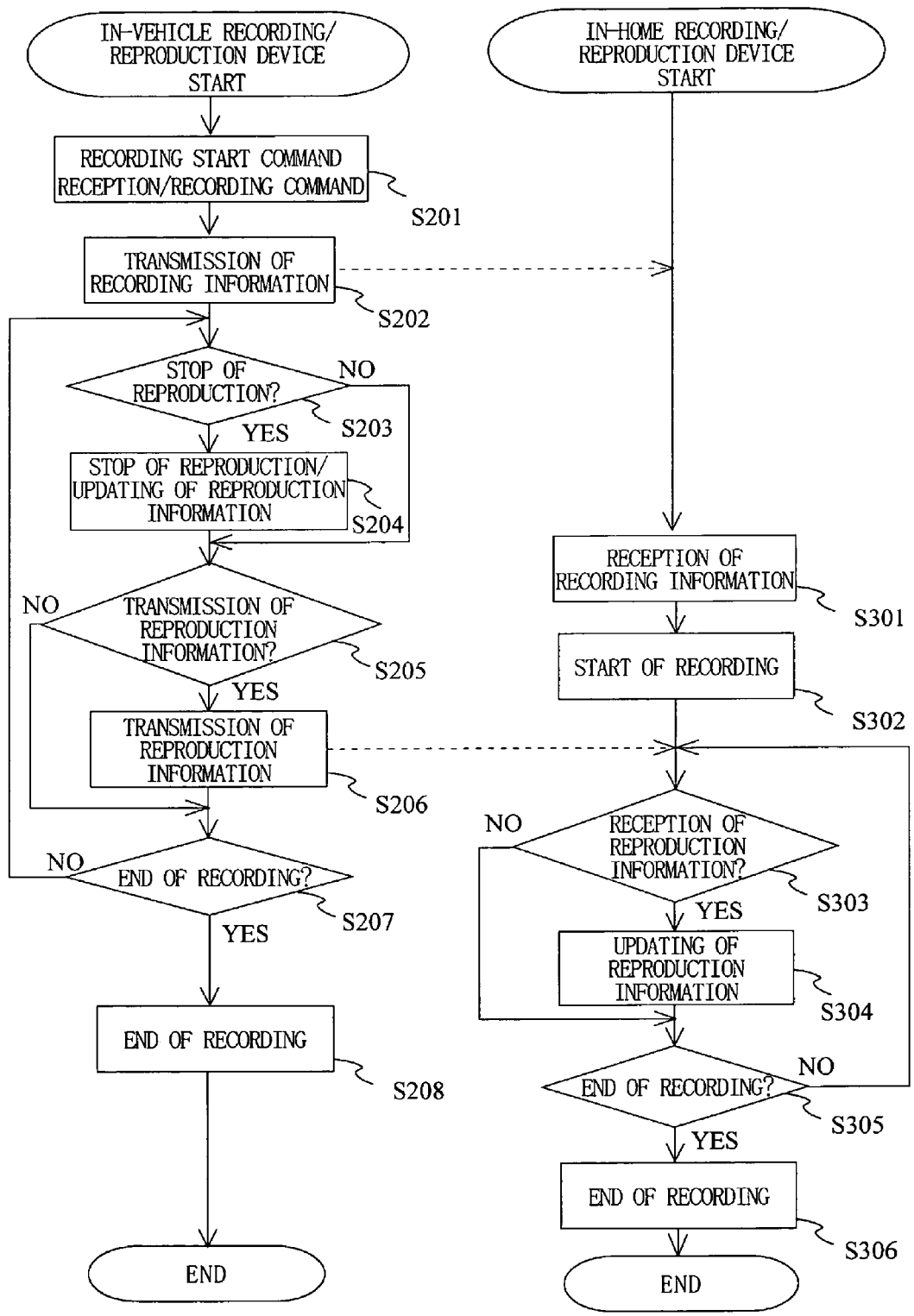
FIG. 7 is a flowchart illustrating operations of an in-vehicle recording/reproduction device 121 and a home recording/reproduction device 303.

FIG. 7 is a flowchart illustrating operations of the in-vehicle recording/reproduction device 121 and the in-home recording/reproduction device 303. Hereinafter, the operations of the in-vehicle recording/reproduction device 121 and the in-home recording/reproduction device 303 will be described with reference to FIG. 7.

Firstly, the operation of the in-vehicle recording/reproduction device 121 will be described. The control section 126 of the in-vehicle recording/reproduction device 121 receives a command (recording start command) from the user who wants to watch the rest of the program which the user watched in the vehicle, on the in-home recording/reproduction device 303, and causes the in-home recording/reproduction device 303 to start recording the desired program and start reproducing the program (step S201). For example, the main body or a remote controller may have a button called a "seamless function button". By the user pushing the seamless function button, the recording start command is transferred to the control section 126 of the in-vehicle recording/reproduction device 121. The seamless function button does not only inform the in-vehicle recording/reproduction device 121 of the recording start command, but also plays a role as a start switch for triggering subsequent operations.

Next, the control section 126 transmits recording information to the in-home recording/reproduction device 303 to cause the in-home recording/reproduction device 303 to record the same program as that which is being recorded by the recording device 103 (step S202).

Next, the control section 126 determines whether or not reproduction should be stopped (step S203). The determination may be performed based on whether or not the vehicle is traveling in a safe place as described in the first embodiment. When reproduction should be stopped, the control section 126 stops reproduction and updates a reproduction start position (step S204) and goes to an operation of step S205. The reproduction start position is similar to that described in the first embodiment. On the other hand, when reproduction should not be stopped, the control section 126 goes to the operation of step S205.

In step S205, the control section 126 determines whether or not reproduction information should be transmitted. Specifically, the control section 126 may transmit reproduction information before a power source is turned OFF when an engine is stopped or transmit reproduction information every time reproduction is stopped.

In step S205, when it is determined that reproduction information should be transmitted, the control section 126 transmits the reproduction information (step S206) and goes to an operation of step S207. On the other hand, when it is determined that reproduction information should not be transmitted, the control section 126 goes to the operation of step S207.

In step S207, the control section 126 determines whether or not recording should be ended. When recording should not be ended, the control section 126 returns to the operation of step S203. On the other hand, when recording should be ended, the control section 126 ends recording (step S208) and ends the process. When ending the process, the control section 126 may transmit final reproduction information to the in-home recording/reproduction device 303.

Next, the operation of the in-home recording/reproduction device 303 will be described. Initially, the in-home recording/reproduction device 303 receives recording information transmitted from the in-vehicle recording/reproduction device 121 (step S301). Next, the in-home recording/reproduction device 303 starts recording a program indicated in the recording information (step S302). Thereby, the same program as that which is recorded in the in-vehicle recording/reproduction device 121 is also recorded in the in-home recording/reproduction device 303.

Next, the in-home recording/reproduction device 303 determines whether or not reproduction information has been received (step S303). When the reproduction information has been received, the in-home recording/reproduction device 303 updates the reproduction information (step S304) and goes to an operation of step S305. On the other hand, when reproduction information has not been received, the in-home recording/reproduction device 303 goes to the operation of step S305.

In the operation of step S305, the in-home recording/reproduction device 303 determines whether or not recording should be ended. Specifically, the determination is performed based on whether or not a program is ended, whether or not there is a specific command from the user, or the like. When recording should not be ended, the in-home recording/reproduction device 303 returns to the operation of step S303. On the other hand, when recording should be ended, the in-home recording/reproduction device 303 ends recording (step S306) and ends the process.

Figure 8:
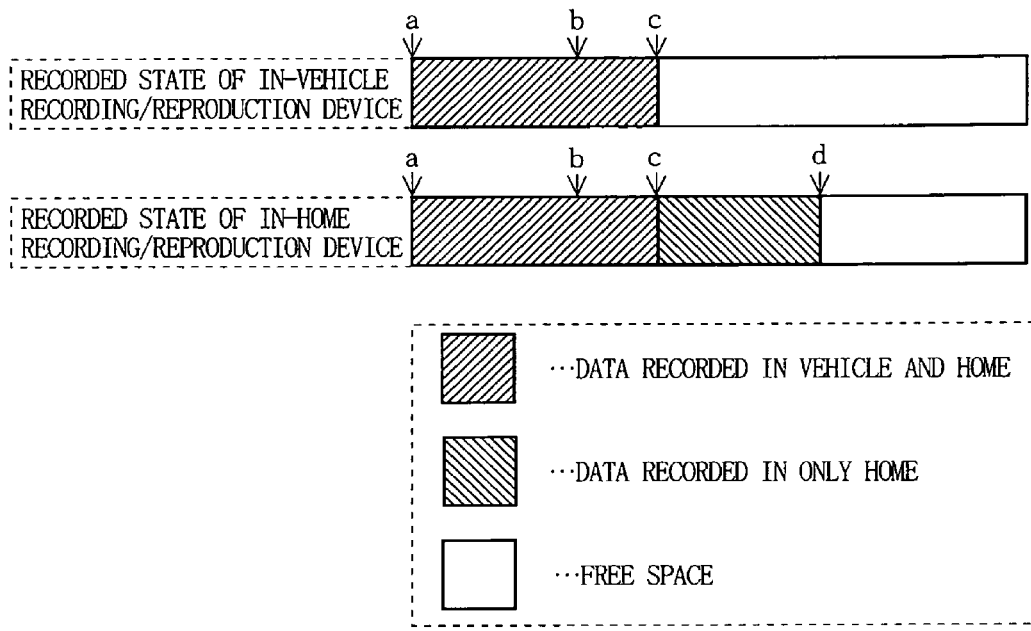
FIG. 8 is a diagram schematically illustrating a recorded state of the in-vehicle recording/reproduction device 121 and a recorded state of the in-home recording/reproduction device 303.

FIG. 8 is a diagram schematically illustrating a recorded state of the in-vehicle recording/reproduction device 121 and a recorded state of the in-home recording/reproduction device 303. In FIG. 8, the lengths of bars indicate respective overall capacities. Note that the lengths of the bars differ from each other, representing a relative relationship in magnitude between the capacities thereof, but not the absolute capacities thereof. Since the recording medium used herein allows random access, recording is performed from various addresses on the disk. However, for the sake of simplicity, it is assumed in FIG. 8 that data is recorded from a left end toward a right end.

Hereinafter, operations of the in-vehicle recording/reproduction device 121 and the in-home recording/reproduction device 303 will be specifically described with reference to FIG. 8. It is assumed that the in-vehicle recording/reproduction device 121 starts recording a program at a point a. At this point, the in-vehicle recording/reproduction device 121 transmits recording information to the in-home recording/reproduction device 303. The in-home recording/reproduction device 303 which has received the recording information starts recording the same program at the point a. Actually, there is a time lag until the recording information reaches the in-home recording/reproduction device 303, and therefore, recording is not started at the exact same point. This problem will be described below.

It is assumed that the in-vehicle recording/reproduction device 121 has performed reproduction until a point b. Next, it is assumed that the in-vehicle recording/reproduction device 121 ends recording at a point c because the power source is turned OFF due to stop of the engine. In this case, the in-vehicle recording/reproduction device 121 stores information about the point b as reproduction information. The in-vehicle recording/reproduction device 121 transmits the reproduction information about the point b to the in-home recording/reproduction device 303 immediately before the power source is turned OFF. Data until the point c is recorded in both the in-vehicle recording/reproduction device 121 and the in-home recording/reproduction device 303.

The in-home recording/reproduction device 303 continues to record the program until a point d at which the program is ended. When the user wants to watch the rest of the program which the user watched in a vehicle, the user issues a command to do so to the in-home recording/reproduction device 303. The in-home recording/reproduction device 303 starts reproduction from the point b while recording the program to achieve chasing reproduction of the desired program.

Note that the above-described points a to d are not actual address pointers, and are information indicating to what degree recording has been done from the recording start position. The point c at which the in-vehicle recording/reproduction device 121 ends recording is not limited to a point when the power source is turned OFF by stopping the engine. Alternatively, recording may be ended by the user arbitrarily specifying the point c. Even when recording is ended in the in-vehicle recording/reproduction device, the program continues to be recorded until the end thereof by the in-home recording/reproduction device 303. Therefore, the user can watch the entire rest of the program. Note that a command to end recording in the in-home recording/reproduction device 303 may be provided in the in-vehicle recording/reproduction device 121.

Figure 9:
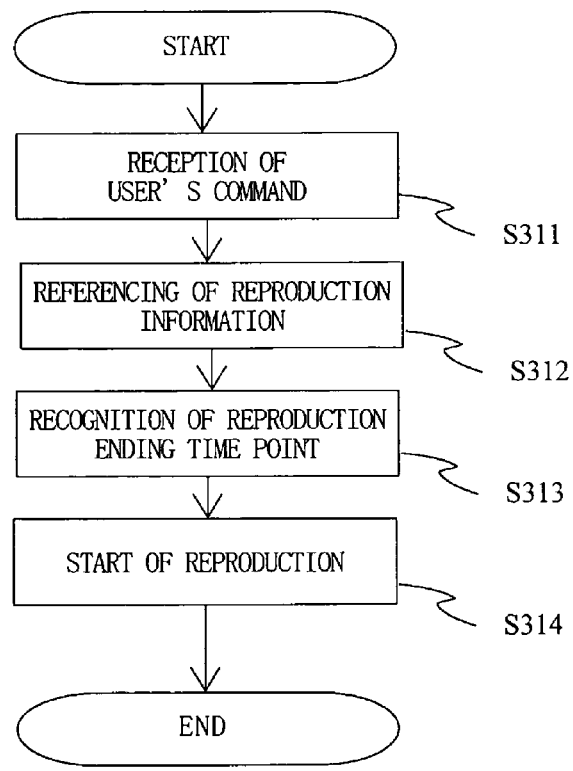
FIG. 9 is a flowchart illustrating an operation of the in-home recording/reproduction device 303 which starts reproduction with reference to reproduction information.

FIG. 9 is a flowchart illustrating an operation of the in-home recording/reproduction device 303 which starts reproduction with reference to reproduction information. Hereinafter, the operation of the in-home recording/reproduction device 303 which starts reproduction with reference to reproduction information will be described with respect to FIG. 9.

Initially, the in-home recording/reproduction device 303 receives a command from the user who wants to watch the rest of a program which the user watched in a vehicle (step S311). For example, a remote controller has a button called a "seamless reproduction button". The command is transferred to the in-home recording/reproduction device 303 by the user pushing the button. The seamless reproduction button plays a role as a start button which triggers subsequent operations. Next, the in-home recording/reproduction device 303 references stored reproduction information (step S312). Next, the in-home recording/reproduction device 303 recognizes when reproduction was ended, based on the referenced reproduction information (step S313). The in-home recording/reproduction device 303 starts reproduction at the point when reproduction was ended (step S314), and ends the process.

Thus, the recording/reproduction system of the second embodiment of the present invention can record the same program as that which the user has watched in a vehicle in the in-home recording/reproduction device 303, and further, can inform the in-home recording/reproduction device 303 of the point when reproduction was last ended in the vehicle. Therefore, the in-home recording/reproduction device 303 can reproduce the entire rest of the program which the user watched partway, at home without missing a scene.

Although, in the second embodiment, it is assumed that the driver watches a television, a similar system can be utilized when a passenger watches a television. When a passenger watches a television, the passenger is permitted to watch irrespective of any driving situation. In this case, the recording device may not be provided, and only the reproduction information transmission process may be performed.

Note that, in step S304, when reproduction information is updated, the in-home recording/reproduction device 303 may delete data which precedes a position indicated by reproduction information which has been received before new reproduction information (i.e., data which has already been reproduced in a vehicle). Thereby, a storage area can be used efficiently.

Note that, in the second embodiment, the in-vehicle recording/reproduction device 121 transmits recording information to the in-home recording/reproduction device 303 so that the same program can be simultaneously recorded by the in-vehicle recording/reproduction device 121 and the in-home recording/reproduction device 303. In addition, information about the point b which is a point when the in-vehicle recording/reproduction device 121 ends reproduction is transmitted as reproduction information to the in-home recording/reproduction device 303, so that the in-home recording/reproduction device 303 starts reproduction of a program from the point b based on the reproduction information. However, if the in-home recording/reproduction device 303 can obtain data relating to the program ranging from the point b to the point c, the present invention is not limited to the operation of the above-described embodiment. For example, when the point c is encountered, the in-vehicle recording/reproduction device 121 may transmit data ranging from the point b to the point c to the in-home recording/reproduction device 303, and based on the transmitted data, the in-home recording/reproduction device 303 may record the program following the point c while reproducing data from the point b. In this case, the in-home recording/reproduction device 303 may reproduce the program recorded after the point c when reproduction of the data ranging from the point b to the point c is ended.

Note that, in the second embodiment, a time lag occurs when recording information travels from the in-vehicle recording/reproduction device 121 to the in-home recording/reproduction device 303. Therefore, a portion occurs which cannot be recorded by the in-home recording/reproduction device 303. To solve this problem, the in-vehicle recording/reproduction device 101 may transmit data ranging from a predetermined time before a recording start position to the recording start position to the in-home recording/reproduction device 303 after transmitting recording information. In this case, the predetermined point is determined based on a time lag caused by communication. In this case, the in-home recording/reproduction device 303 receives transmitted data and records the data so that the data is continuously linked to data which has been recorded therein. Thereby, a program until recording information reaches is recorded in the in-home recording/reproduction device 303.

The in-vehicle recording/reproduction device 121 may also recognize a recording start position by communicating with the in-home recording/reproduction device 303, and transfer only data which has not been reproduced in the in-vehicle recording/reproduction device 121 and has not been recorded in the in-home recording/reproduction device 303 to the in-home recording/reproduction device 303. Note that a button or a menu screen specialized to transfer the data which has not been reproduced in the in-vehicle recording/reproduction device 121 and has not been recorded in the in-home recording/reproduction device 303 to the in-home recording/reproduction device 303, may be provided.

In the second embodiment, the in-vehicle communication section 301 and the in-home communication section 302 communicate with each other via the Internet. The present invention is not limited to this. Any system via which the in-vehicle communication section 301 and the in-home communication section 302 can communicate with each other may be used. For example, the in-vehicle communication section 301 and the in-home communication section 302 may directly communicate with each other via a cellular telephone network.

In the second embodiment, a television signal has been described as an exemplary input signal. The present invention is not limited to this. Data containing a video signal may be received as an input signal.

When a DVD-Video is watched in a vehicle instead of a television program, the in-vehicle recording/reproduction device 121 may transmit an address which was last reproduced in the vehicle to the in-home recording/reproduction device 303. When the user subsequently reproduces the same DVD-Video, the in-home recording/reproduction device 303 may reproduce a continuation of a scene which the user last watched in the vehicle by referencing the address. In this case, the in-vehicle recording/reproduction device 121 needs to transmit information for specifying a medium of the DVD-Video in addition to the reproduction information.

Also in the case of data which does not contain a video signal, such as radio broadcast or the like, it is similarly possible to listen to the rest of data which the user listened to in a vehicle.

In the second embodiment, the in-home recording/reproduction device 303 starts recording by receiving recording information from the in-vehicle recording/reproduction device 121. The present invention is not limited to this. For example, the in-home recording/reproduction device 303 may start recording when the vehicle reaches close to home. In this case, the in-home recording/reproduction device 303 obtains information about a distance between the vehicle and home. When the vehicle reaches within a specific distance, recording may be started. The distance information between the vehicle and home can be obtained by operating a car navigation system in association with a GPS. Alternatively, the in-vehicle recording/reproduction device 121 may transmit recording information to the in-home recording/reproduction device 303 when the distance between a vehicle and home becomes smaller than a predetermined value. Alternatively, the in-home recording/reproduction device 303 may start recording in accordance with a command from the user at any timing.

In the in-vehicle recording/reproduction device 121, a recording start command is transmitted by the user pushing the seamless function button. The present invention is not limited to this. For example, an option "seamless function" may be provided in an operation menu. By the user selecting the option on the menu screen, a recording start command may be transmitted. Alternatively, when the user starts watching a television program, recording may be automatically started and a recording start command may be transmitted. In this case, if the automatic seamless function can be switched ON/OFF by presetting, it is possible to address the case where the user ordinarily does not want recording.

Note that the relationship in magnitude between the capacity of the recording medium of the in-home recording/reproduction device 303 and the capacity of the recording medium of the in-vehicle recording/reproduction device 121 is not limited to that described above.

It is assumed above that the seamless reproduction button is pushed when the user wants to reproduce a continuation of a scene, which the user last watched in the vehicle, in the in-home recording/reproduction device 303. The present invention is not limited to this. For example, an option "seamless reproduction" may be provided in an operation menu. By the user selecting the option on the menu screen, the continuation may be reproduced.

In the second embodiment, the rest of a program which was being watched in the vehicle is reproduced in the in-home recording/reproduction device 303. The present invention is not limited to this. For example, the in-home recording/reproduction device 303 may reproduce the program a predetermined time before a scene which the user last watched. Thereby, the user can recognize the continuity of scenes.

Third Embodiment

In a third embodiment, a description will be given of a recording/reproduction system with which, when the user drives after watching a television at home, the user can watch the rest of a television program which the user watched without missing a scene. A structural diagram of the system is similar to that of the second embodiment and FIG. 6 will be referenced.

Figure 10:
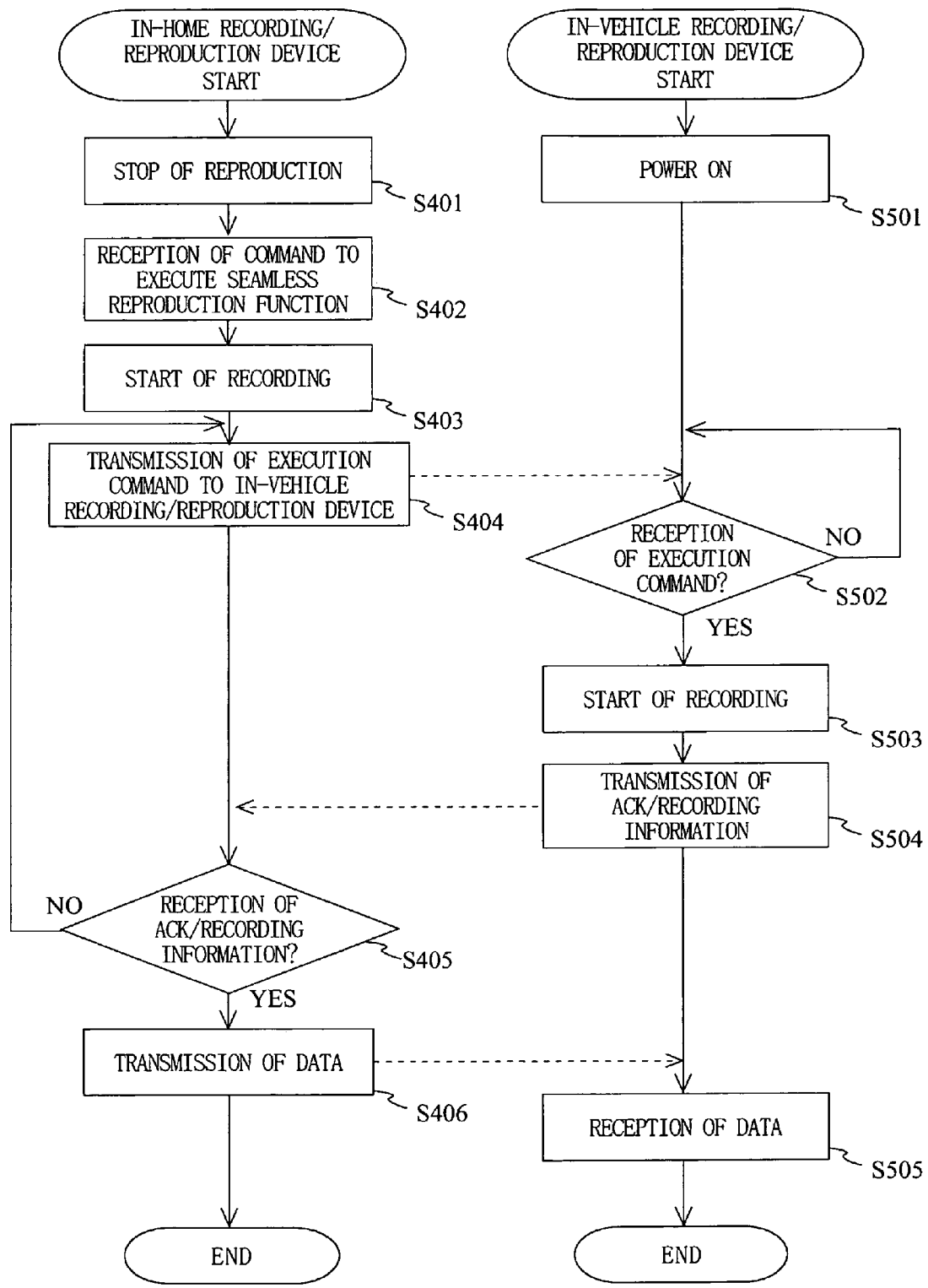
FIG. 10 is a flowchart illustrating operations of an in-vehicle recording/reproduction device and a home recording/reproduction device according to a third embodiment of the present invention.

FIG. 10 is a flowchart illustrating operations of an in-vehicle recording/reproduction device and an in-home recording/reproduction device according to the third embodiment of the present invention. Hereinafter, the operations of the in-vehicle recording/reproduction device and the in-home recording/reproduction device will be described with reference to FIG. 10.

Firstly, the operation of the recording/reproduction device will be described.

The in-home recording/reproduction device stops reproduction of a television program in accordance with, for example, a command from the user (step S401). In this case, the television program which was being reproduced may be either a television program which is chase-reproduced or a television program which is broadcast in real time.

Next, the in-home recording/reproduction device receives an execution command from the user who wants to watch in a vehicle the rest of a program which the user watched (step S402). A function to watch the rest of a program which the user watched is referred to as a seamless reproduction function. For example, a remote controller or the main body of the in-home recording/reproduction device is provided with a "seamless function button". By the user pushing the button, a command to execute the seamless reproduction function is input to the in-home recording/reproduction device. The seamless function button plays a role as a start button which triggers subsequent operations.

Next, the in-home recording/reproduction device starts recording a program which is targeted by a command to execute the seamless reproduction function (step S403). Note that, when the program has already been being recorded by timer recording or the like, the in-home recording/reproduction device continues to record the program.

Next, the in-home recording/reproduction device transmits a command to execute the seamless reproduction function to the in-vehicle recording/reproduction device (step S404). On the other hand, the in-vehicle recording/reproduction device transmits back an ACK signal indicating reception of the execution command and recording start information indicating a point where recording was started (the ACK signal and the recording start information are collectively referred to as ACK recording information). This will be described below.

The in-home recording/reproduction device determines whether or not the ACK signal and the recording start information have been received from the in-vehicle recording/reproduction device (step S405). When the ACK signal and the recording start information have not been received, the in-home recording/reproduction device returns to the operation of step S404, and transmits the execution command again. The in-home recording/reproduction device transmits the execution command again after a predetermined period of time is elapsed (e.g., one minute). When no ACK signal is returned after a predetermined period of time is elapsed (e.g., 10 minutes), the in-home recording/reproduction device stops transmitting the execution command.

On the other hand, when the ACK signal and the recording information have been received, the in-home recording/reproduction device recognizes, based on the recording information, data which was recorded from when reproduction of a desired program was stopped until when recording was started in the in-vehicle recording/reproduction device, and transmits the data to the in-vehicle recording/reproduction device (step S406), and ends the process.

Next, an operation of the in-vehicle recording/reproduction device will be described.

Initially, the in-vehicle recording/reproduction device is powered ON (step S501). Next, the in-vehicle recording/reproduction device determines whether or not a command to execute the seamless reproduction function has been received from the in-home recording/reproduction device (step S502). The in-home recording/reproduction device transmits the execution command at intervals of one minute, so that the in-vehicle recording/reproduction device can receive the execution command within one minute.

When the command to execute the seamless reproduction function has not been received, the in-vehicle recording/reproduction device repeats the operation of step S502. On the other hand, when the command to execute the seamless reproduction function has been received, the in-vehicle recording/reproduction device starts recording a desired program (step S503), and goes to an operation of step S504.

In the operation of step S504, the in-vehicle recording/reproduction device transmits an ACK signal indicating reception of the execution command and recording start information indicating a point where recording was started to the in-home recording/reproduction device (step S504). The recording start information is time information indicating a point where recording was started. When the time indicated by a clock of the in-vehicle recording/reproduction device is not equal to the time indicated by a clock of the in-home recording/reproduction device, an inconsistency occurs. These devices are accurately synchronized with each other using a radio clock or the like.

On the other hand, the in-home recording/reproduction device transmits data of a scene which could not be recorded by the in-vehicle recording/reproduction device. Therefore, the in-vehicle recording/reproduction device receives the data (step S505), and ends the process.

Thereafter, when the in-vehicle recording/reproduction device reproduces the rest of the program in response to a command from the user, the data received from the in-home recording/reproduction device is first reproduced before data recorded by the in-vehicle recording/reproduction device is reproduced. Specifically, the flowchart of FIG. 2 or the flowcharts of FIGS. 3 and 4 are referenced because of the similarity to the first embodiment. Note that, in step S102 or S122, when a reproduction start position is initialized, the start position of the data received in step S505 is registered as a reproduction start position. A "seamless reproduction button" is provided on a remote controller or the in-vehicle recording/reproduction device. By the user pushing the button, reproduction is started. Thereby, a continuation of a scene which was watched at home can be watched.

Figure 11:
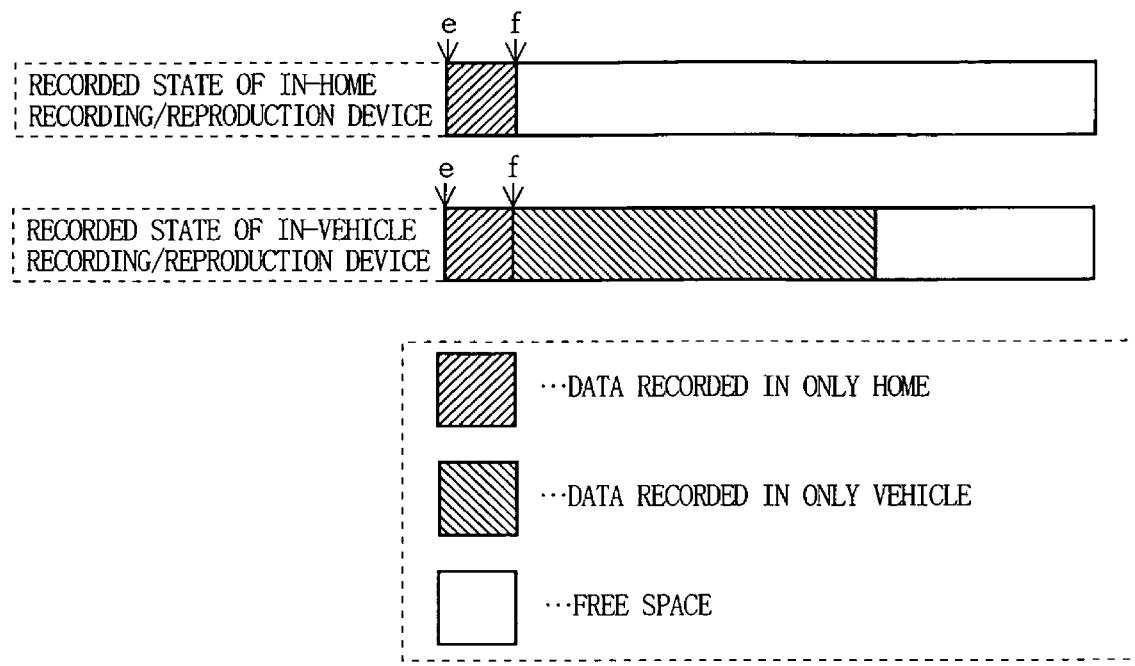
FIG. 11 is a diagram schematically illustrating a recorded state of an in-vehicle recording/reproduction device and a recorded state of a home recording/reproduction device.

FIG. 11 is a diagram schematically illustrating a recorded state of the in-vehicle recording/reproduction device and a recorded state of the in-home recording/reproduction device. FIG. 11 is illustrated in a manner similar to that of FIG. 8.

Hereinafter, operations of the in-vehicle recording/reproduction device and the in-home recording/reproduction device will be described with reference to FIG. 11. It is assumed that the in-home recording/reproduction device starts recording for the purpose of the seamless reproduction function at a point e. Thereafter, the in-home recording/reproduction device transmits a command to execute the seamless reproduction function. If the in-vehicle recording/reproduction device receives the execution command at a point f, the in-vehicle recording/reproduction device starts recording a desired program from the point f, and transmits back an ACK signal and recording information to the in-home recording/reproduction device.

The in-home recording/reproduction device, which has received the returned signal, transmits data which was recorded until the point f to the in-vehicle recording/reproduction device. The in-vehicle recording/reproduction device receives and stores the data into a recording medium thereof. Thereby, data ranging from the point e where reproduction was stopped at home to the point f is stored in the in-vehicle recording/reproduction device, so that the user can watch the program which the user watched at home, without missing a scene.

As described above, in the recording/reproduction system of the third embodiment of the present invention, the rest of a television program which was being watched at home is temporarily recorded in the in-home recording/reproduction device, and data of scenes which could not be watched during the time when the user moved from home to the vehicle is transferred to the in-vehicle recording/reproduction device. Thereby, even when the user has to stop watching a television program at home and go out and drive a vehicle, the user can watch the program in the vehicle without missing a scene.

In the third embodiment, the in-home recording/reproduction device transmits data to the in-vehicle recording/reproduction device after receiving an ACK signal. The present invention is not limited to this. For example, the in-vehicle recording/reproduction device may request data transmission, and in response to this, the in-home recording/reproduction device may transmit data which has been recorded.

In the third embodiment, a program to be watched is limited to one that is currently broadcast. The present invention is not limited to this. For example, when the user wants to watch in a vehicle a program or the like which has already been recorded, the in-home recording/reproduction device may transmit all of the recorded data to the in-vehicle recording/reproduction device or reproduce all data which has not been reproduced. In the case of a medium, such as a DVD-Video or the like, the in-home recording/reproduction device may transmit an address point where reproduction was stopped to the in-vehicle recording/reproduction device. Based on the address point, the in-vehicle recording/reproduction device reproduces the disk at some midpoint thereof to allow the user to watch the rest of the contents thereof.

In the third embodiment, the in-home recording/reproduction device transmits a command to execute the seamless reproduction function to the in-vehicle recording/reproduction device every one minute. The present invention is not limited to this. For example, in consideration of the time from when reproduction is stopped at home to when an engine is started in a vehicle, i.e., a distance between the in-home recording/reproduction device and a garage, time intervals may be set at which the in-home recording/reproduction device transmits the execution command. Similarly, the time out is set to be 10 minutes in the above-described embodiment, or alternatively, may be set to any appropriate time.

In the third embodiment, by the user pushing the seamless function button, the in-home recording/reproduction device transmits a command to execute the seamless reproduction function. The present invention is not limited to this. For example, transmission of the seamless reproduction function executing command may be selected from an operation menu. Alternatively, the in-home recording/reproduction device may automatically transmit the seamless reproduction function executing command. In this case, if the user does not drive a vehicle, the in-home recording/reproduction device does not wastedly record a program, since the seamless reproduction function is stopped due to time-out.

Note that the time of stopping reproduction (step S401) may be either earlier or later than the time of powering ON (step S501).

In the third embodiment, a radio clock is used to synchronize the clock of the in-vehicle recording/reproduction device with the clock of the in-home recording/reproduction device. The present invention is not limited to this. A similar system can be implemented even when the clocks are synchronized with each other by other methods.

By pushing the seamless reproduction button, reproduction is started in the in-vehicle recording/reproduction device. The present invention is not limited this. For example, reproduction may be started by selection from an operation menu. Alternatively, when the in-vehicle recording/reproduction device gets ready to reproduce a continuation of a scene which the user last watched at home, the in-vehicle recording/reproduction device may automatically start reproduction.

In the third embodiment, scenes which are watched in a vehicle follow a scene which was last reproduced at home. The present invention is not limited to this. For example, the in-home recording/reproduction device may always record data for a predetermined time before a current time. Data starting from a scene slightly before a scene which was last reproduced may be transmitted to the in-vehicle recording/reproduction device. The in-vehicle recording/reproduction device may start reproduction from the slightly preceding scene.

In the third embodiment, the in-home recording/reproduction device starts recording after reproduction is stopped. A recording command may be transmitted to the in-vehicle recording/reproduction device before reproduction is stopped to start recording. Thereby, the recording operation of the in-home recording/reproduction device can be omitted.

The recording/reproduction devices and systems of the first to third embodiments are assumed to be used in a vehicle and home. The present invention is not limited to these applications. The recording/reproduction device of the above-described embodiment can be used in a situation where the user wants to watch a television program while doing something else. In this case, scenes of a television program can be reproduced intermittently without missing a scene. For example, when the user wants to watch a television program while doing household chores, reproduction may be performed only when the user is present in front of a television set. Alternatively, when the user wants to watch a video while, for example, performing management of a factory or a building, reproduction may be performed only when the user is present in front of a monitor. In such a case, a control section may determine whether or not watching is permitted, based on a control signal from a human sensing sensor.

Fourth Embodiment

In a fourth embodiment, a recording/reproduction system will be described in which, when a plurality of users watch a television program (e.g., the driver watches a front display and a passenger watches a back seat display), each user can watch at home the rest of the television program which the user watched in a vehicle.

Figure 12:
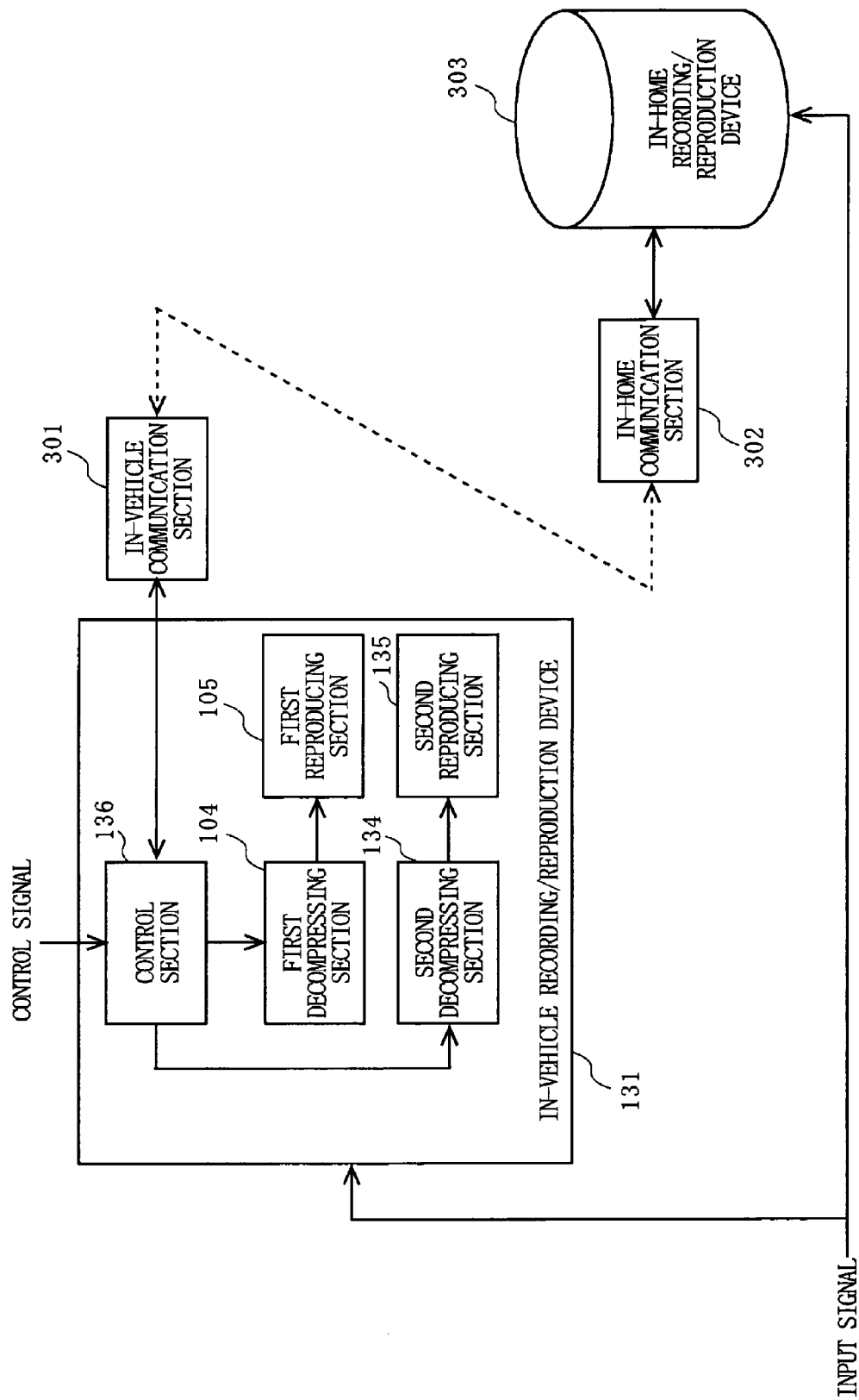
FIG. 12 is a diagram illustrating a recording/reproduction system according to a fourth embodiment of the present invention.

FIG. 12 is a diagram illustrating a recording/reproduction system according to the fourth embodiment of the present invention. In FIG. 12, the recording/reproduction system comprises an in-vehicle recording/reproduction device 131, an in-vehicle communication section 301, an in-home communication section 302, and an in-home recording/reproduction device 303. The in-vehicle recording/reproduction device 131 comprises a control section 136, a second decompressing section 134, a second reproducing section 135, a compressing section (not shown), a recording device (not shown), a first decompressing section 104, and a first reproducing section 105. The control section 136 corresponds to the control section 126 of the second and third embodiments. The compressing section and the recording device have similar functions to those of the first to third embodiment and are not illustrated in FIG. 12. The first decompressing section 104 and the first reproducing section 105 have similar functions to those of the decompressing section 104 and the reproducing section 105 of the first embodiment and are thus referenced with the same reference numerals.

As with the first decompressing section 104, the second decompressing section 134 is connected to a recording device (not shown). The second decompressing section 134 has a similar function to that of the first decompressing section 104, and reads compressed data from a recording device and decompresses the read compressed data to generate a television signal.

The second reproducing section 135 reproduces and displays the television signal generated by the second decompressing section 134. For example, the second reproducing section 135 displays a video signal on the back seat display and outputs an audio signal through a headphone of the back seat.

In the fourth embodiment, as in the second and third embodiments, it is assumed that the in-vehicle communication section 301 communicates with the control section 136, and via the Internet (not shown) or the like, the in-home communication section 302.

Similarly, a television signal is input as an input signal to the in-vehicle recording/reproduction device 131 and the in-home recording/reproduction device 303.

In the in-vehicle recording/reproduction device 131, it is assumed that the driver and the passenger watch the same television program. Since the driver is not permitted to watch when the vehicle is traveling, the driver and the passenger may watch different scenes in the same program.

The control section 136 commands the in-home recording/reproduction device 303 to start recording a television signal as required. The control section 136 transmits to the in-home recording/reproduction device 303 recording information similar to that described in the second embodiment. The control section 136 also transmits reproduction information to the in-home recording/reproduction device 303. In the fourth embodiment, reproduction information includes first reproduction information which indicates what program and which scene thereof were last reproduced in the first reproducing section 105 and second reproduction information indicating what program and which scene thereof were last reproduced in the second reproducing section 135. As described above, the program designated in the first reproduction information is the same as the program designated in the second reproduction information.

As in the second embodiment, the in-home recording/reproduction device 303 records and/or reproduces an input television signal in response to a command from the in-vehicle recording/reproduction device 131. The in-home recording/reproduction device 303 starts recording when receiving the recording information transmitted from the in-vehicle recording/reproduction device 131. Also, the in-home recording/reproduction device 303 stores the reproduction information from the in-vehicle recording/reproduction device 131. The reproduction information includes the first and second reproduction information. Therefore, the in-home recording/reproduction device 303 manages what program and which scene thereof each of the driver and the passenger last watched in the vehicle.

The operations of the in-vehicle recording/reproduction device 131 and the in-home recording/reproduction device 303 in the fourth embodiment are substantially the same as those described in the second embodiment and are performed in accordance with the flowchart of FIG. 7. A difference is that the contents of reproduction information to be updated in step S204 include the first reproduction information which indicates what program and which scene thereof were last reproduced in the first reproducing section 105 and the second reproduction information indicating what program and which scene thereof were last reproduced in the second reproducing section 135.

Hereinafter, a description will be given of how reproduction is performed in the in-vehicle recording/reproduction device 131. The first reproducing section 105 has been described in the first and second embodiments. In the second reproducing section 135, since the viewer is the passenger, reproduction can be performed no matter whether the vehicle is traveling.

A description will be given with reference to FIG. 8. Points a, b, and d are the same as those described in the second embodiment. A point c is a point where recording was ended in the vehicle and the passenger stopped watching, i.e., a point where reproduction was ended in the second reproducing section 135. Thus, information about the point b is the first reproduction information. Information about the point c is the second reproduction information. Therefore, even when the point where reproduction was ended in the first reproducing section 105 is different from the point where reproduction was ended in the second reproducing section 135, the reproduction information includes as information these points where reproduction was ended.

Figure 13:
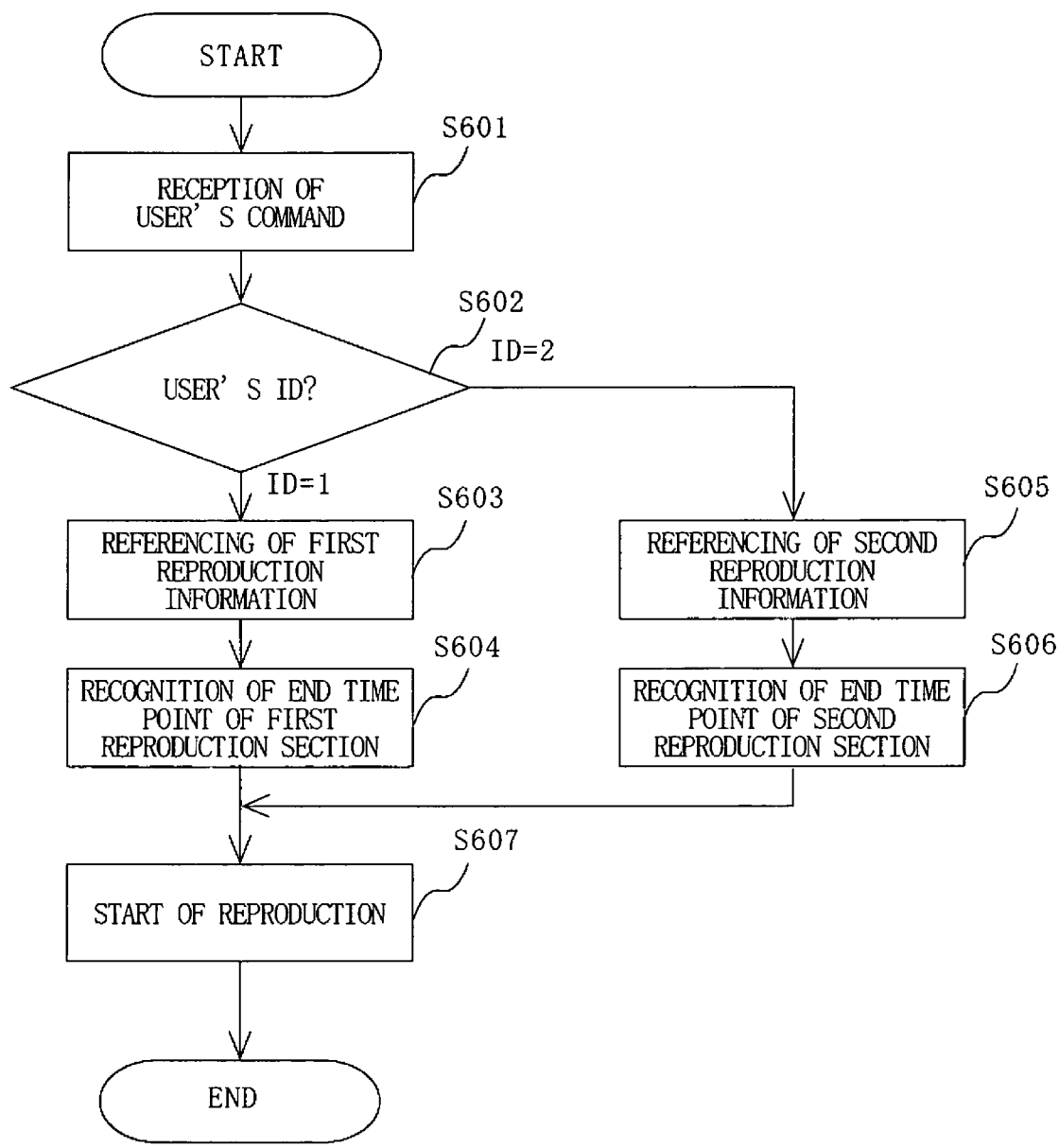
FIG. 13 is a flowchart illustrating an operation of a home recording/reproduction device 303 in which reproduction is started with reference to reproduction information.

FIG. 13 is a flowchart illustrating an operation of the in-home recording/reproduction device 303 in which reproduction is started with reference to the reproduction information. Hereinafter, the operation of the in-home recording/reproduction device 303 in which reproduction is started with reference to the reproduction information will be described with reference to FIG. 13.

Initially, the in-home recording/reproduction device 303 receives a command from the user (step S601). For example, a remote controller is provided with a "seamless reproduction button 1" and a "seamless reproduction button 2". By the user pushing one of these buttons, a corresponding command is transferred to the in-home recording/reproduction device 303. The seamless reproduction buttons 1 and 2 play a role as start buttons which trigger subsequent operations.

Next, the in-home recording/reproduction device 303 determines a user ID (step S602). Specifically, when the button which was pushed in step S601 is the seamless reproduction button 1, ID=1. When the seamless reproduction button 2 was pushed, ID=2. When ID=1, the in-home recording/reproduction device 303 goes to an operation of step S603. On the other hand, when ID=2, the in-home recording/reproduction device 303 goes to an operation of step S605.

In step S603, the in-home recording/reproduction device 303 references the first reproduction information. Next, the in-home recording/reproduction device 303 recognizes at what point reproduction was ended in the first reproducing section 105 (step S604) and goes to an operation of step S607.

In step S605, the in-home recording/reproduction device 303 references the second reproduction information. Next, the in-home recording/reproduction device 303 recognizes at what point reproduction was ended in the second reproducing section 135 (step S606) and goes to the operation of step S607.

In step S607, the in-home recording/reproduction device 303 reproduces a recorded program from the point recognized in step S604 or step S606 and ends the process.

Thus, in the recording/reproduction system of the fourth embodiment of the present invention, the points where reproduction of a program which was being watched by the driver and the passenger were ended are included in respective reproduction information, and reproduction can be started from the respective reproduction ending points in the in-home recording/reproduction device. Therefore, the driver and the passenger can reproduce and watch the respective rests of the program at home from respective scenes which were last watched.

Reproduction is started in the in-home recording/reproduction device by pushing the seamless reproduction button 1 or the seamless reproduction button 2. The present invention is not limited to this. For example, start of reproduction may be selected from an operation menu by each user.

In the fourth embodiment, a television program is watched on two displays, i.e., the front display and the back seat display. The present invention is not limited to this. Three or more displays may be watched by different users. In this case, the in-vehicle recording/reproduction device comprises decompressing sections and reproducing sections in the same number as that of the displays, and reproduction information includes information indicating which scene was last reproduced in each reproducing section. The in-home recording/reproduction device may comprise the same number of seamless reproduction buttons or menu options so that a continuation of a scene may be reproduced for each user.

The reproduction ending point of the passenger has been assumed to be the same as the recording ending point of the in-vehicle recording/reproduction device. The present invention is not limited to this. When reproduction is temporarily stopped because, for example, the passenger wants to enjoy watching a landscape or talks on a cellular telephone, the reproduction ending point is a scene before the recording ending point.

Fifth Embodiment

In a fifth embodiment, a recording/reproduction system will be described in which there are a plurality of users in a vehicle as in the fourth embodiment, but they watch different television programs.

Figure 14:
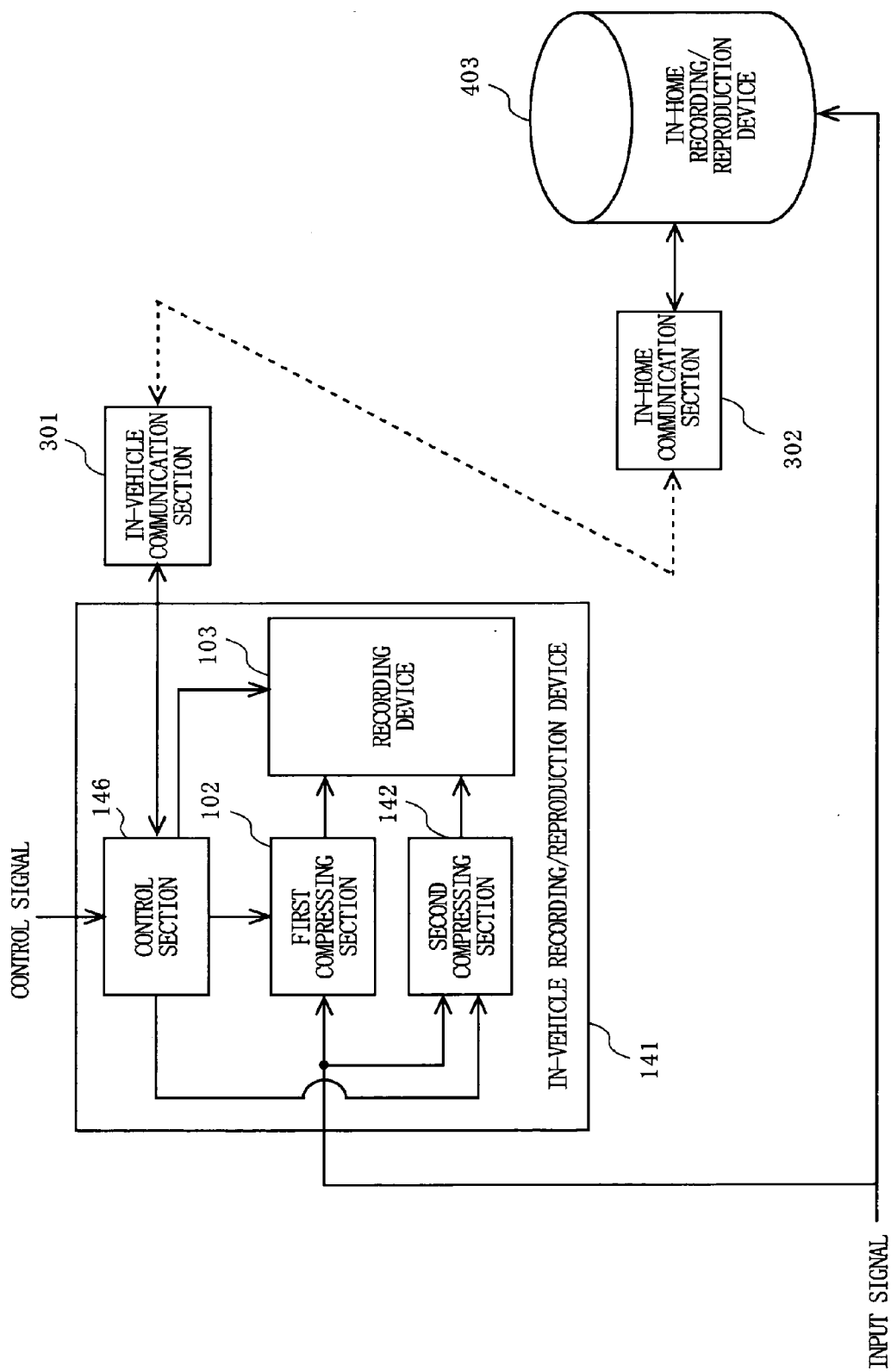
FIG. 14 is a diagram illustrating a structure of a recording/reproduction system according to a fifth embodiment of the present invention.

FIG. 14 is a diagram illustrating a structure of a recording/reproduction system according to the fifth embodiment of the present invention. In FIG. 14, the recording/reproduction system comprises an in-vehicle recording/reproduction device 141, an in-vehicle communication section 301, an in-home communication section 302, and an in-home recording/reproduction device 903. The in-vehicle recording/reproduction device 141 comprises a control section 196, a second compressing section 142, a first compressing section 102, a recording device 103, a decompressing section (not shown), a reproducing section (not shown), a second decompressing section (not shown), and a second reproducing section (not shown). The control section corresponds to the control section 126 of the third embodiment and the control section 136 of the fourth embodiment, and is connected to the second compressing section. The first compressing section is similar to the compressing section 102 of the first embodiment. The second compressing section 142 receives and compresses an input signal and outputs compressed television data to the recording device 103 as in the first compressing section 102. The other components are similar to those of the recording/reproduction system of the fourth embodiment. The in-home recording/reproduction device 403 corresponds to the in-home recording/reproduction devices 303 of the second to fourth embodiments and has a function to simultaneously record a plurality of different television programs.

Operations of the in-vehicle recording/reproduction device 141 and the in-home recording/reproduction device 403 of the fifth embodiment are substantially the same as those of the second embodiment and are performed in accordance with the flowchart of FIG. 7. A difference is in the contents of recording information transmitted in step S202 and the contents of reproduction information updated in step S204.

The recording information transmitted in step S202 includes first recording information about a program to be reproduced in the first reproducing section and second recording information about a program to be reproduced in the second reproducing section. The in-home recording/reproduction device 403, which has received the recording information, simultaneously records two programs, i.e., a program to be reproduced in the first reproducing section and a program to be reproduced in the second reproducing section, in accordance with the transmitted recording information.

The reproduction information transmitted in step S206 includes first reproduction information indicating what program and which scene thereof were last reproduced in the first reproducing section 105 and second reproduction information indicating what program and which scene thereof were last reproduced in the second reproducing section 135, as in the fourth embodiment.

Figure 15:
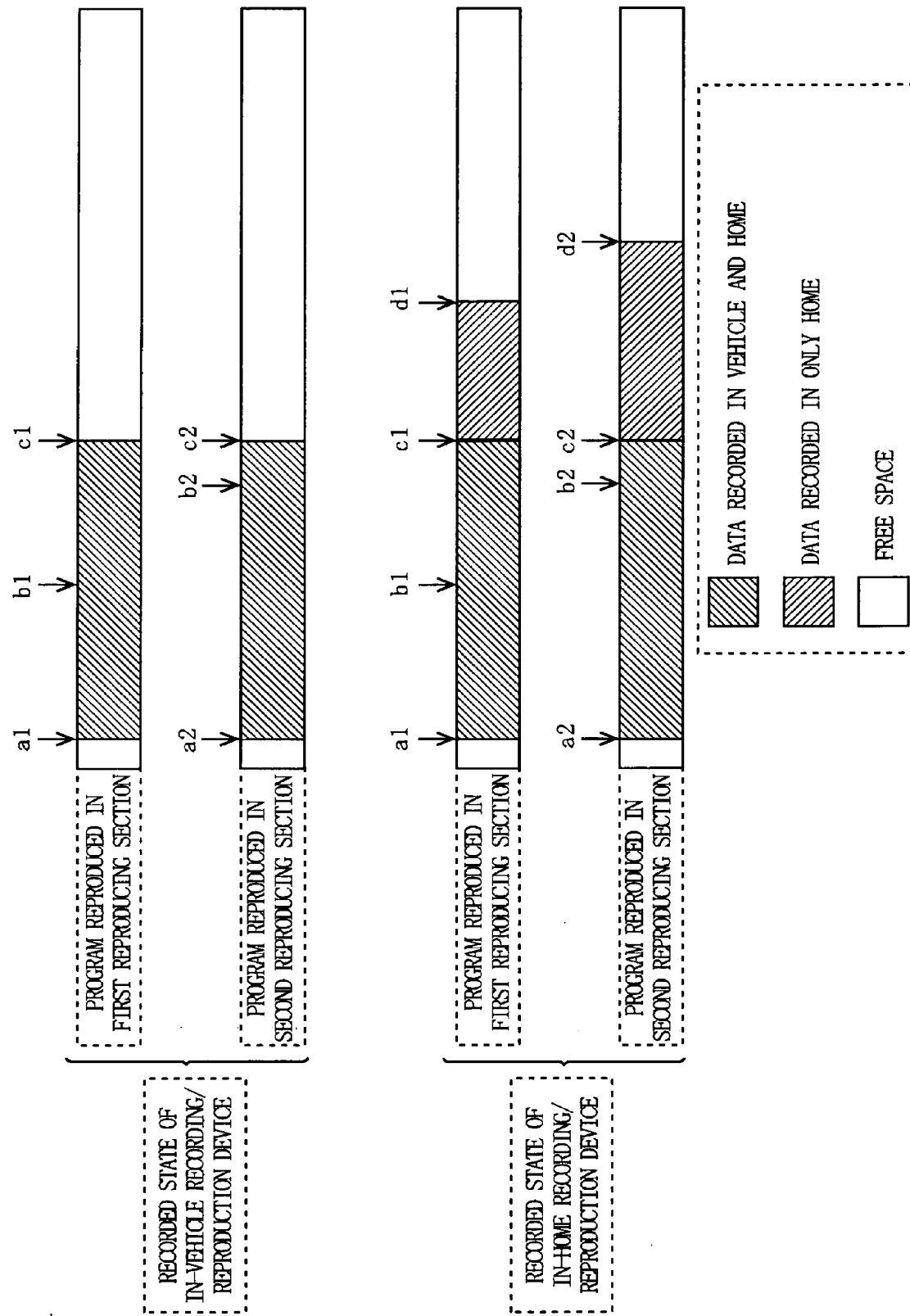
FIG. 15 is a diagram schematically illustrating a recorded state of an in-vehicle recording/reproduction device 191 and a recorded state of a home recording/reproduction device 903.

FIG. 15 is a diagram schematically illustrating a recorded state of the in-vehicle recording/reproduction device 141 and a recorded state of the in-home recording/reproduction device 403.

Hereinafter, operations of the in-vehicle recording/reproduction device 141 and the in-home recording/reproduction device 303 will be specifically described with reference to FIG. 15. Note that a program reproduced in the first reproducing section and a program reproduced in the second reproducing section are represented with the same pattern in bars. As described above, however, since the first reproducing section and the second reproducing section reproduce different programs, the in-vehicle recording/reproduction device 141 and the in-home recording/reproduction device 403 simultaneously record the two different programs.

Points a1 and a2 correspond to the point a of FIG. 8. In the in-vehicle recording/reproduction device 141, the first reproducing section and the second reproducing section start reproducing the programs from the point a1 and a2, respectively. In the fifth embodiment, it is assumed that the points a1 and a2 indicate the same time.

Points b1 and b2 correspond to the point b of FIG. 8. Specifically, the point b1 is a point where reproduction was ended in the first reproducing section and the point b2 is a point where reproduction was ended in the second reproducing section. In this case, reproduction information includes first reproduction information about the point b1 and second reproduction information about the point b2.

Points c1 and c2 correspond to the point c of FIG. 8. These are points where the in-vehicle recording/reproduction device 141 stopped recording the programs. When the in-vehicle recording/reproduction device stops recording, the point c1 and the point c2 match each other if both the program reproduced in the first reproducing section and the program reproduced in the second reproducing section are still being broadcast.

Points d1 and d2 correspond to the point d of FIG. 8. Specifically, the point d1 is a point where broadcasting of the program reproduced in the first reproducing section was ended and the point d2 is a point where broadcasting of the program reproduced in the second reproducing section was ended. The in-home recording/reproduction device 403 continues to record the program reproduced in the first reproducing section until the point d1, and the program reproduced in the second reproducing section until the point d2.

When the user wants to watch the rest of a program which the user watched in the vehicle, the user issues a command to do so to the in-home recording/reproduction device 903. The in-home recording/reproduction device 403 starts reproducing the program reproduced in the first reproducing section from the point b1 or the program reproduced in the second reproducing section from the point b2.

Note that the points a1 to d1 and the points a2 to d2 are information indicating to what degree recording has been done from the recording start position, but not actual address pointers, as with the points a to d.

A reproduction operation of the in-home recording/reproduction device 403 of the fifth embodiment of the present invention in which reproduction information is referenced is basically performed in accordance with the flowchart of FIG. 13 described in the fourth embodiment. By the user pushing, for example, a "seamless reproduction button 1" or a "seamless reproduction button 2" provided on a remote controller, the in-home recording/reproduction device 403 starts an operation. When the seamless reproduction button 1 is pushed, the in-home recording/reproduction device 403 references the first reproduction information included in the reproduction information to recognize a program which was reproduced in the first reproducing section and a point where reproduction was ended, and starts reproduction from that point. Similarly, when the "seamless reproduction button 2" is pushed, the in-home recording/reproduction device 403 references the second reproduction information included in the reproduction information to recognize a program which was reproduced in the second reproducing section and a point where reproduction was ended, and starts reproduction from that point.

Thus, in the recording/reproduction system of the fifth embodiment of the present invention, for example, even when the driver and the passenger watched different programs, the driver and the passenger can watch continuations of respective scenes which they watched in the vehicle.

In the first to fifth embodiments, it is not assumed that channels are changed. When channels are changed while watching programs in a vehicle, the in-vehicle recording/reproduction device may transmit recording information again at the time of changing channels, and in response to this, the in-home recording/reproduction device may change programs to be recorded. This case will be hereinafter described in detail.

Figure 16:
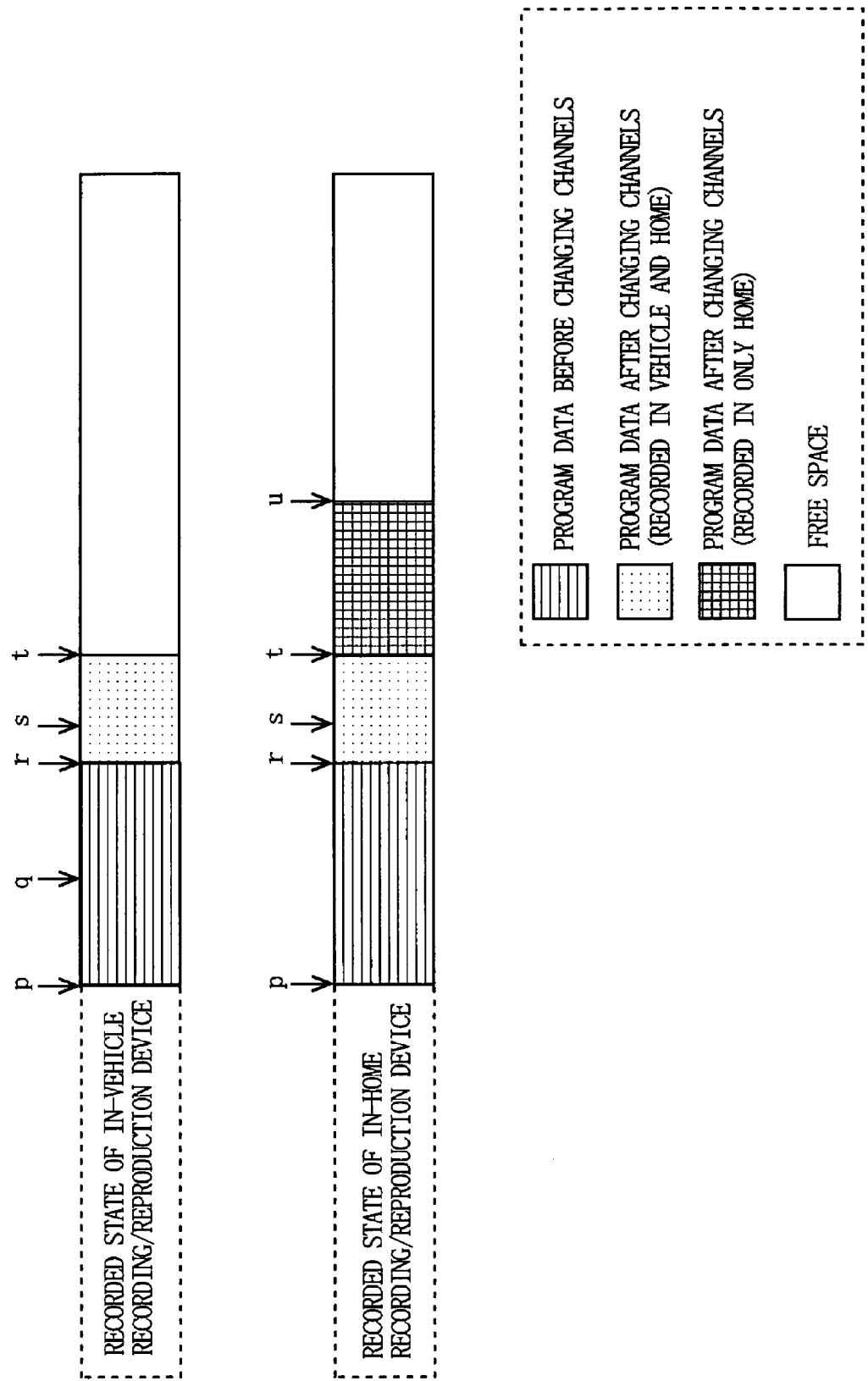
FIG. 16 is a diagram schematically illustrating recorded states of an in-vehicle recording/reproduction device and a home recording/reproduction device when programs watched by the driver (reproduced in a reproducing section) are changed.

FIG. 16 is a diagram schematically illustrating recorded states of the in-vehicle recording/reproduction device and the in-home recording/reproduction device when programs watched by the driver (reproduced in the reproducing section) are changed. In FIG. 16, a point p corresponds to the point a1 of FIG. 15, where the driver started watching a program. A point q is a point where channels are changed. A point r is a point where recording of the next program (a program after changing channels) was started. The driver watches a program while repeatedly pausing and reproducing. Therefore, channels are changed when watching a scene before a broadcast scene. In the case of FIG. 16, channels are changed when watching a point q. At this time, a program after changing channels broadcasts a scene at the point r, so that the next program is recorded from the point r. In this case, a portion ranging from the point q to the point r of the program before changing channels has not been reproduced. The in-vehicle recording/reproduction device commands the in-home recording/reproduction device to stop recording the program before changing channels at the point (the point q) where channels were changed, and transmits new recording information to start recording a program after changing channels.

A point s corresponds to the point b1 of FIG. 15. Information about the point s is information which is transmitted as final reproduction information from the in-vehicle recording/reproduction device to the in-home recording/reproduction device.

A point t corresponds to the point c1 of FIG. 15 and is a point where recording the program was ended in the in-vehicle recording/reproduction device. A point u corresponds to the point d1 of FIG. 15 and is a point where broadcasting of the program after changing channels was ended. The in-home recording/reproduction device continues to record the program until the point u.

Thus, when channels are changed, the in-vehicle recording/reproduction device and the in-home recording/reproduction device may stop recording a program which has been so far watched and start recording a new program.

Note that, when the in-vehicle and/or in-home recording/reproduction devices have a function to record programs on a plurality of channels, the in-vehicle and/or in-home recording/reproduction devices may continue to record a program before changing channels without stopping recording.

The same is true of when programs watched by the passenger (reproduced in the second reproducing section) are changed. In this case, in FIG. 16, there is a possibility that the point q and the point r are the same point. Similarly, there is a possibility that the point s and the point t are the same point.

Data of a program before changing channels (the point p to the point r) may be deleted at a time where channels were changed since changing channels by the user may mean that the user does not want to watch the program. Alternatively, a portion which has not been reproduced (the point q to the point r) may be stored, but is not deleted.

In FIG. 15, it is assumed that the points a1 and a2 are the same time. The present invention is not limited to this. The points a1 and a2 may be different times. In this case, recording information may be transmitted to the in-home recording/reproduction device at each of the points a1 and a2.

Note that, also in the fifth embodiment, three or more displays may be watched by different users, as in the fourth embodiment.

INDUSTRIAL APPLICABILITY

As described above, the in-vehicle recording/reproduction device, the recording/reproduction device, the recording/reproduction system, and the recording/reproduction method of the present invention permit the user to watch the rest of data which was being watched using an in-vehicle device, using an external device without missing a scene, and alternatively, to watch a program which was being watched using the external device, using the in-vehicle device without missing a scene. The present invention is useful as a recording/reproduction device, a recording/reproduction device, a recording/reproduction system, a recording/reproduction method, and the like for achieving reproduction between a vehicle and home without missing a scene.

The invention claimed is:

1. A recording/reproduction system comprising:
 a first recording/reproduction device provided in a vehicle and operable to receive a signal,
 a second recording/reproduction device provided outside the vehicle and operable to receive the signal and communicate with the first recording/reproduction device,
 the first recording/reproduction device comprising:
  a first recording device into which data is recorded and from which the recorded data is read out;
  a reproducing section operable to read and reproduce the data recorded in the first recording device;
  a recording information transmitting section operable, when starting recording the data in the first recording/reproduction device, to transmit to the second recording/reproduction device recording information regarding the data, the device recording information including a first point in time where recording was started in the first recording/reproduction device;

a reproduction information transmitting section operable to transmit to the second recording/reproduction device reproduction information indicating a second point in time where reproduction of the data was stopped in the first recording/reproduction device, the second point in time being after the first point in time; and a data transmitting section operable to, after the device recording information is transmitted, transmit to the second recording/reproduction device data which is recorded for a predetermined time from a beginning of the recording, and the second recording/reproduction device comprising:

a second recording device for recording data based on the first point included in the device recording information transmitted from the first recording/reproduction device;

a reproduction starting section operable to start reproduction in the second recording/reproduction device from the second point indicated by the device reproduction information from the first recording/reproduction device; and a data receiving/recording section operable to record the data transmitted from the data transmitting section so that the data is continuously linked to the data which has already been recorded in the second recording/reproduction device.

2. The recording/reproduction system according to claim 1, wherein the first recording/reproduction device further comprises an unrecorded data transmitting section operable to recognize a recording start position in the second recording/reproduction device and operable to transmit to the second recording/reproduction device data which has not been reproduced in the first recording/reproduction device and has not been recorded in the second recording/reproduction device.

3. A recording/reproduction device for recording and reproducing data based on an input signal and for use with an external device, the recording/reproduction device comprising:

a recording device into which the data is recorded and from which the recorded data is read out;

a reproducing section operable to read and reproduce the data recorded in the recording device;

a recording information transmitting section operable, when starting recording the data in the recording/reproduction device, to transmit to the external device recording information regarding the data which the recording/reproduction device started recording, the device recording information including a first point in time where recording was started in the first recording/reproduction device;

a reproduction information transmitting section operable to transmit to the external device reproduction information indicating a second point in time where reproduction of the data was stopped in the recording/reproduction device, the second point in time being after the first point in time; and a data transmitting section operable to, after the device recording information is transmitted, transmit to the external device data which is recorded for a predetermined time from a beginning of the recording.

4. The recording/reproduction device according to claim 3, wherein the reproduction information transmitting section transmits the reproduction information before the vehicle is powered OFF.

5. The recording/reproduction device according to claim 3, wherein the reproduction information transmitting section transmits the reproduction information every time reproduction is stopped in the recording/reproduction device.

6. The recording/reproduction device according to claim 3, further comprising an unrecorded data transmitting section operable to recognize a recording start position in the recording/reproduction device and operable to transmit to the external device data which has not been reproduced in the recording/reproduction device and has not been recorded in the external device.

7. The recording/reproduction device according to claim 3, further comprising a specialized button for activating at least one of the recording information transmitting section, the reproduction information transmitting section, and the unrecorded data transmitting section.

8. The recording/reproduction device according to claim 3, wherein a specialized menu for activating at least one of the recording information transmitting section, the reproduction information transmitting section, and the unrecorded data transmitting section, is displayed on an operation screen for operating the recording/reproduction device.

9. A recording/reproduction device for recording and reproducing data based on an input signal and for use with an external device, the recording/reproduction device comprising:

a recording section operable to receive device recording information transmitted from the external device regarding the data, the recording information including a first point in time where recording of the data was started in the external device, and operable to record the data based on the recording information;

a reproduction starting section operable to receive reproduction information indicating a second point in time, the second point in time being after the first point in time, where reproduction of the data was stopped in the external device, the reproduction information being transmitted from the external device, and to start reproduction in the recording/reproduction device from the second point based on the reproduction information; and a data receiving/recording section operable to receive and record data before a recording start position of the recording/reproduction device so that the data is continuously linked to the data which has already been recorded in the recording/reproduction device.

10. The recording/reproduction device according to claim 9, wherein the reproduction starting section starts reproduction from a point located a predetermined time before a reproduction point indicated in the reproduction information.

11. The recording/reproduction device according to claim 9, further comprising a specialized button for activating the reproduction starting section.

12. The recording/reproduction device according to claim 9, wherein a specialized menu for activating the reproduction starting section is displayed on an operation screen for operating the recording/reproduction device.

13. The recording/reproduction device according to claim 9, further comprising a deleting section operable to delete data before the point indicated by the reproduction information.

14. A recording/reproduction method for reproducing in a second recording/reproduction device the rest of data which was reproduced in a first recording/reproduction device, the first recording/reproducing device and the second recording/reproducing device being in a system comprising the first recording/reproduction device and the second recording/reproduction device which can receive a same signal and can communicate with each other, the recording/reproduction method comprising:
- causing the first recording/reproduction device, when the first recording/reproduction device starts recording the data, to transmit to the second recording/reproduction device recording information for causing the second recording/reproduction device to record the data, the recording information including a first point in time where recording was started in the first recording/reproduction device;
- causing the second recording/reproduction device to start recording the data recorded in the first recording/reproduction device in accordance with the first point indicated by the recording information from the first recording/reproduction device;
- causing the first recording/reproduction device to transmit to the second recording/reproduction device reproduction information indicating a second point in time where reproduction was stopped in the first recording/reproduction device, the second point in time being after the first point in time;
- causing the first recording/reproduction device to, after the device recording information is transmitted, transmit to the second recording/reproduction device data which is recorded for a predetermined time from a beginning of the recording;
- causing the second recording/reproduction device to perform reproduction from the second point indicated by the reproduction information transmitted from the first recording/reproduction device; and
- causing the second recording/reproduction device to record the data transmitted from the first recording/reproduction device so that the data is continuously linked to the data which has already been recorded in the second recording/reproduction device.

* * * * *